United States Patent [19]
Ito et al.

[11] Patent Number: 6,032,869
[45] Date of Patent: Mar. 7, 2000

[54] HEATING APPARATUS FOR VEHICLE

[75] Inventors: Koichi Ito; Yoshihiko Okumura, both of Kariya; Yoshimitsu Inoue, Chiryu; Kazutaka Suzuki; Yasutoshi Yamanaka, both of Kariya; Yuichi Shirota, Anjo; Hiroshi Nonoyama, Toyota; Manabu Miyata, Obu; Hikaru Sugi, Nagoya, all of Japan

[73] Assignee: Denso Corporation, Kariya, Japan

[21] Appl. No.: 08/831,239

[22] Filed: Apr. 2, 1997

[30] Foreign Application Priority Data

Apr. 3, 1996 [JP] Japan ..................................... 8-081727
Apr. 18, 1996 [JP] Japan ..................................... 8-097186

[51] Int. Cl.[7] ................................................. B60H 1/02
[52] U.S. Cl. .................... 237/12.3 B; 237/2 A; 165/103
[58] Field of Search .............................. 237/2 A, 12.3 A, 237/12.3 B, 12.3 C; 165/103, DIG. 109

[56] References Cited

U.S. PATENT DOCUMENTS

| | | | |
|---|---|---|---|
| 3,779,307 | 12/1973 | Weiss et al. ............................... | 165/42 |
| 4,010,895 | 3/1977 | Kofink et al. ....................... | 237/12.3 C |
| 4,632,306 | 12/1986 | Bleeker et al. ..................... | 237/12.3 C |
| 4,718,600 | 1/1988 | Adam ........................................ | 237/2 A |
| 5,095,855 | 3/1992 | Fukuda et al. ......................... | 123/41.44 |
| 5,407,130 | 4/1995 | Uyeki et al. ........................ | 237/12.3 B |
| 5,497,941 | 3/1996 | Numazawa et al. ..................... | 237/2 A |

FOREIGN PATENT DOCUMENTS

| | | |
|---|---|---|
| 53-114140 | 10/1978 | Japan . |
| 5-221233 | 8/1993 | Japan . |
| 5-93923 | 12/1993 | Japan . |

*Primary Examiner*—Henry A. Bennett
*Assistant Examiner*—Derek S. Boles
*Attorney, Agent, or Firm*—Harness, Dickey & Pierce, P.L.C.

[57] ABSTRACT

When the engine is stopped while the engine is warmed up, the cooling water in the engine stays therein without flowing out of the engine, and the cooling water in the radiator or the bypass passage is used for heating source for the heating operation. In this way, it is possible to heat the passenger compartment continuously even after the engine is stopped and to suppress the temperature of the cooling water from lowering to reduce the emission at restarting of the engine.

10 Claims, 23 Drawing Sheets

| MODE | VALVE 13 | VALVE 14 | VALVE 15 |
|---|---|---|---|
| GENERAL TRAVELLING | A  21, 27, 22 | C  23, 21, 24 | E  26, 27, 25 |
| REST MODE | B | C ↑ | F |
| FAST HEATING | B ↑ | C ↑ | F ↑ |
| PRE-WARMING UP | A | D ↓ | E or F |
| DEAD SOAK | A ↑ | C | E |

FIG. 24

HEATING APPARATUS FOR VEHICLE

CROSS REFERENCE TO THE RELATED APPLICATION

This application is based on and claims priority of Japanese Patent Application Nos. Hei. 8-81727 filed on Apr. 3, 1996, and Hei. 8-97186 filed on Apr. 18, 1996, the content of which are incorporated herein by reference.

BACKGROUND OF THE INVENTION

1. Field of the Invention

The present invention relates to a heating apparatus for heating a passenger compartment of a vehicle, by using cooling water of a water-cooled engine as heating source, and is preferably employed in a hybrid type vehicle switching both of the engine and the motor as driving force of the engine.

2. Description of Related Art

The hybrid type vehicles have been conceived to reduce the exhaust gas (hereinafter referred to as "emission") containing carbon monoxide, nitrogen oxide or the like which are harmful to a human body, discharged from the engine. More, specifically, the hybrid type vehicle generally runs with a motor driven by an electric power charged in a battery. When the electric power charged in the battery lowers less than a predetermined value, the vehicle runs with an engine to generate electricity and to charge the battery. When the electric power charged in the battery recovers up to the predetermined value, the vehicle runs with the motor again.

That is, by using the motor and the engine as a main driving source and a sub driving source, respectively, a time period during which the engine operates is shortened so that the emission is reduced. Accordingly, to promote the reduction of the emission in the hybrid type vehicle in future, it is necessary to prolong a stopping time of the engine.

Even in the hybrid type vehicle, similar to a conventional vehicle having only the engine as the driving source, a heater core using cooling water of the engine as heating source is employed as heating means for heating air blown out into the passenger compartment. Accordingly, during a heating operation, the cooling water coming from the engine is introduced directly into the heater core, not only when the engine operates but also when the engine is stopped.

However, whether the engine is operating or not is determined by a state of the electric power charged in the battery, and therefore, when the passenger is present in the vehicle such as when the vehicle is running, the engine is occasionally stopped. Accordingly, when the engine as heating source of the cooling water is stopped during the heating operation, the heating capacity is lowered in accordance with the decrease in a temperature of the cooling water, which causes a problem in that it is impossible to heat the passenger compartment effectively entire over the stopping time of the engine. If the engine is restarted while the engine is cold, the emission may increase as compared with when the engine is warm.

The above-described problem is not limited to the hybrid type vehicle. For example, in a conventional vehicle having only the engine as driving source, such a problem occurs when the engine is idling such as when the vehicle is stopping to wait for the traffic lights to change, while the heating operation is continued (i.e., in a rest mode).

SUMMARY OF THE INVENTION

In view of the above-described problem, an object of the present invention is to suppress the temperature of the cooling water from decreasing while heating the passenger compartment by using the heater core after the engine is stopped, so that the emission is reduced when the engine is restarted.

According to the present invention, there is formed an engine bypass circuit in which cooling water having flowed out of a heating heat exchanger bypasses an engine and flows into the heating heat exchanger. When the engine is stopped, an electric water pump is operated to generate a flow of the cooling water and control means controls switching means such that the cooling water circulates in the engine bypass circuit.

In this way, when the engine is stopped while the engine is warmed up, the cooling water in the engine stays therein without flowing out of the engine, and the cooling water in a radiator or a bypass passage is used for heating source for the heating operation. Therefore, it is possible to heat the passenger compartment continuously even after the engine is stopped and to suppress the temperature of the cooling water from lowering to reduce the emission at restarting of the engine.

Further, since the radiator or the bypass circuit is commonly used for the heating operation without providing additional parts, it is possible to heat the passenger compartment continuously even after the engine is stopped and to reduce the emission, while suppressing an increase of the manufacturing cost of the heating apparatus for the vehicle.

BRIEF DESCRIPTION OF THE DRAWINGS

Additional objects and advantages of the present invention will be more readily apparent from the following detailed description of preferred embodiments thereof when taken together with the accompanying drawings in which:

FIG. 24 is a table describing the operating states of the valves in the various modes.

DETAILED DESCRIPTION OF THE PREFERRED EMBODIMENTS

Embodiments according to the present invention are hereinafter described with reference to the accompanying drawings.

A first embodiment of the present invention will be described.

Figure 1:
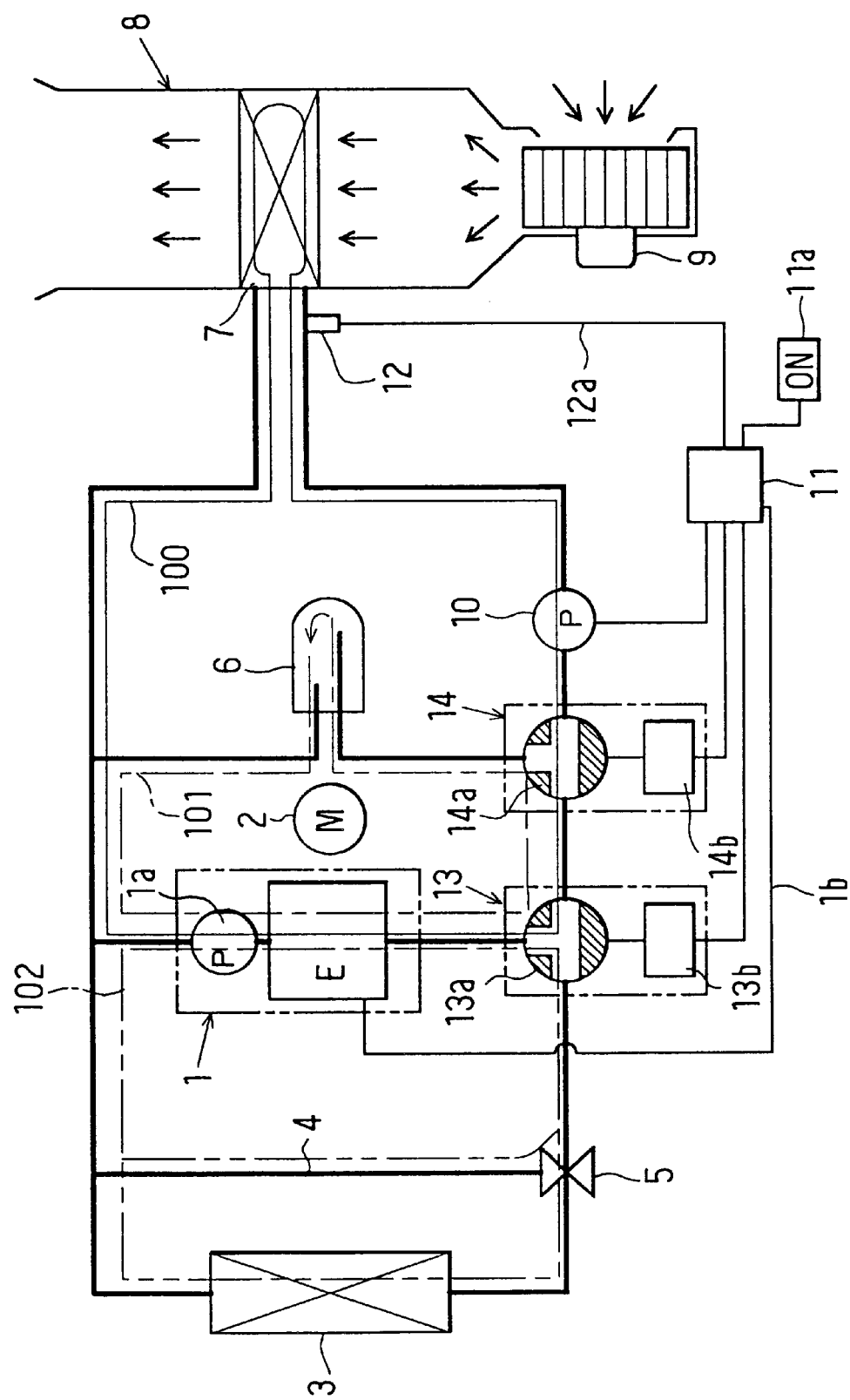
FIG. 1 is a schematic view of the heating apparatus for a vehicle according to a first embodiment.

FIG. 1 is a schematic view in which a heating apparatus for a vehicle according to this embodiment is employed in a hybrid vehicle. A pump 1a pressurizes and pumps engine cooling water (hereinafter referred to as "cooling water") while being driven by a driving force of a water-cooled engine for running a vehicle (hereinafter referred to as "engine"). A motor 2 for running the vehicle is operated by receiving an electric power from a battery (not shown). The vehicle travels by switching the motor 2 and the engine 1.

A radiator 3 performs a heat exchange between the cooling water and air outside the passenger compartment. A bypass circuit 4 is formed to bypass the radiator 3. A thermostat 5 is of a known type for switching a case when the cooling water flowing out of the engine 1 is returned into the radiator 3 and a case when cooling water flowing out of the engine 1 is returned into the bypass circuit 4. The thermostat 5 switches the radiator 3 and the bypass circuit 4 in accordance with a temperature of the cooling water passing in the thermostat 5.

A heat accumulating tank 6 thermally insulates the cooling water to maintain a temperature thereof and accumulates therein a predetermined amount of the cooling water. The heat accumulating tank 6 is made of material which is superior in the corrosion resistance such as stainless. A heater core 7 is of a known type for heating air blown out into the passenger compartment, by using the cooling water as heating source. The heater core 7 is disposed in an air conditioning case 8, which will be described later.

A blower 9 is for blowing air, and air blown out from the blower 9 flows in the air conditioning case 8 for forming an air passage therein, is heated by the heater core 7, and is blown out into the passenger compartment.

An electric pump 10 receives an electric power from the battery to pump the cooling water toward the heater core 7. An operating state of the electric pump 10 is controlled by the control unit 11. To the control unit 11 input a signal 12a from a temperature sensor 12 disposed at an inlet side of the heater core 7, for detecting a temperature of the cooling water, and a signal 1b from a rotational sensor (not shown) for detecting a rotational speed of the engine 1.

The three positioning valve 13 for switching a flow of the cooling water is constructed by a valve body 13a and an actuator 13b for actuating the valve body 13a. The three positioning valve 14 for switching a flow of the cooling water is also constructed by a valve body 14a and an actuator 14b for actuating the valve body 14a. The actuators 13b and 14b are controlled by the control unit 11. A flow of the cooling water flowing into the heater core 7 is controlled by the electric pump 10, the control unit 11, and the three positioning valves 13 and 14.

An operation of this embodiment will be described.

Figure 2:
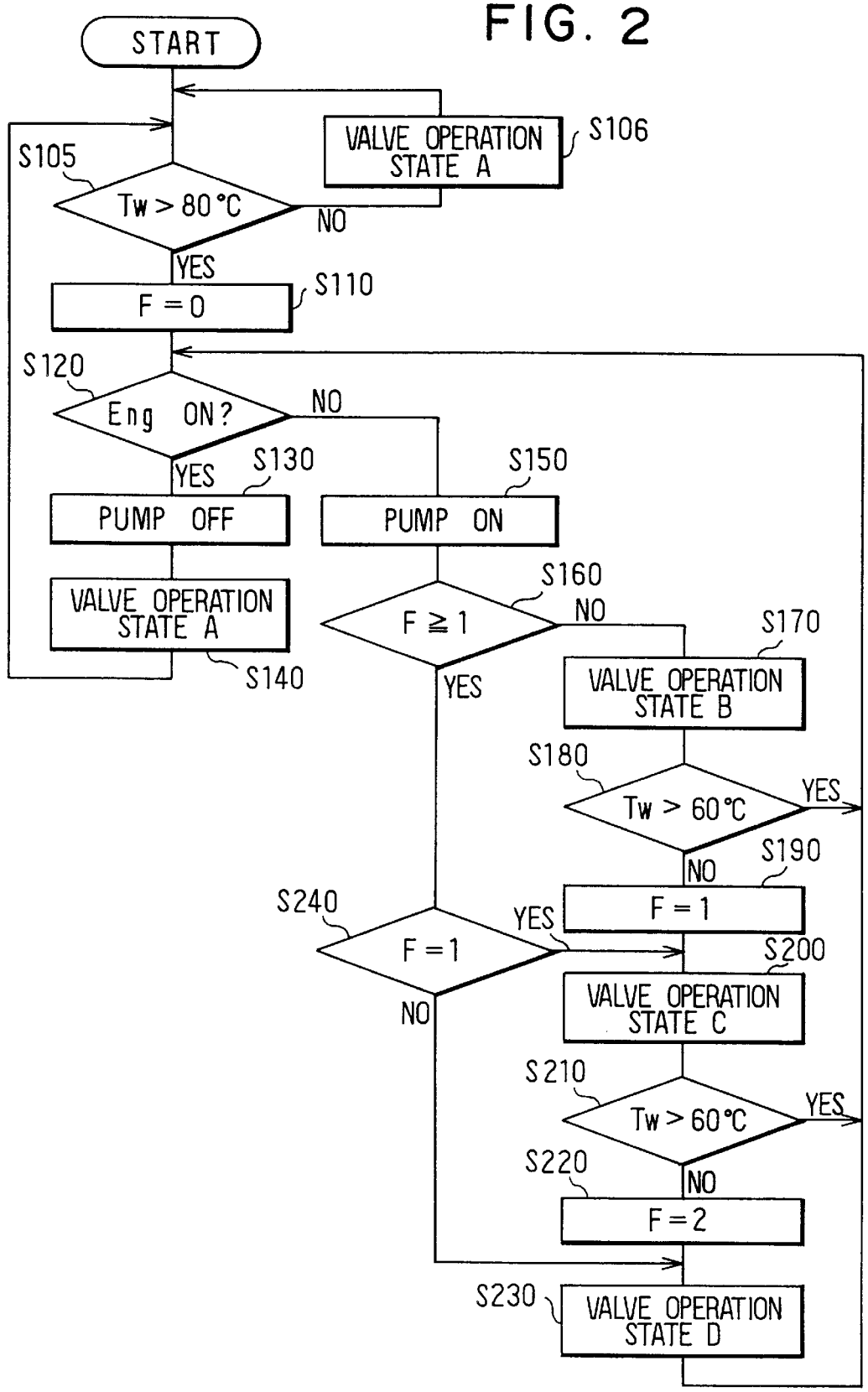
FIG. 2 is a flow chart showing an operation of the first embodiment.

FIG. 2 is a flow chart showing an operation of the heating apparatus according to this embodiment. Prior to a specific description of the operation, the following terms are defined.

(1) Valve operation state A (see FIG. 1)

In this operation state, as shown in FIG. 1, the three positioning valves 13 and 14 are controlled such that the cooling water flows through all of the engine 1, the radiator 3 or the bypass circuit 4, the heat accumulating tank 6, and the heater core 7. More specifically, the cooling water returns simultaneously in the following three circuits.

That is, there are three circuits of a first heating circuit 100 in which the cooling water from the engine 1 returns through the heater core 7 to the engine 1, a heat accumulating circuit 101 in which the cooling water from the engine 1 returns through the heat accumulating tank 6, and a cooling circuit 102 in which the cooling water from the engine 1 returns through the radiator 3 or the bypass circuit 4 to the engine 1.

Figure 3:
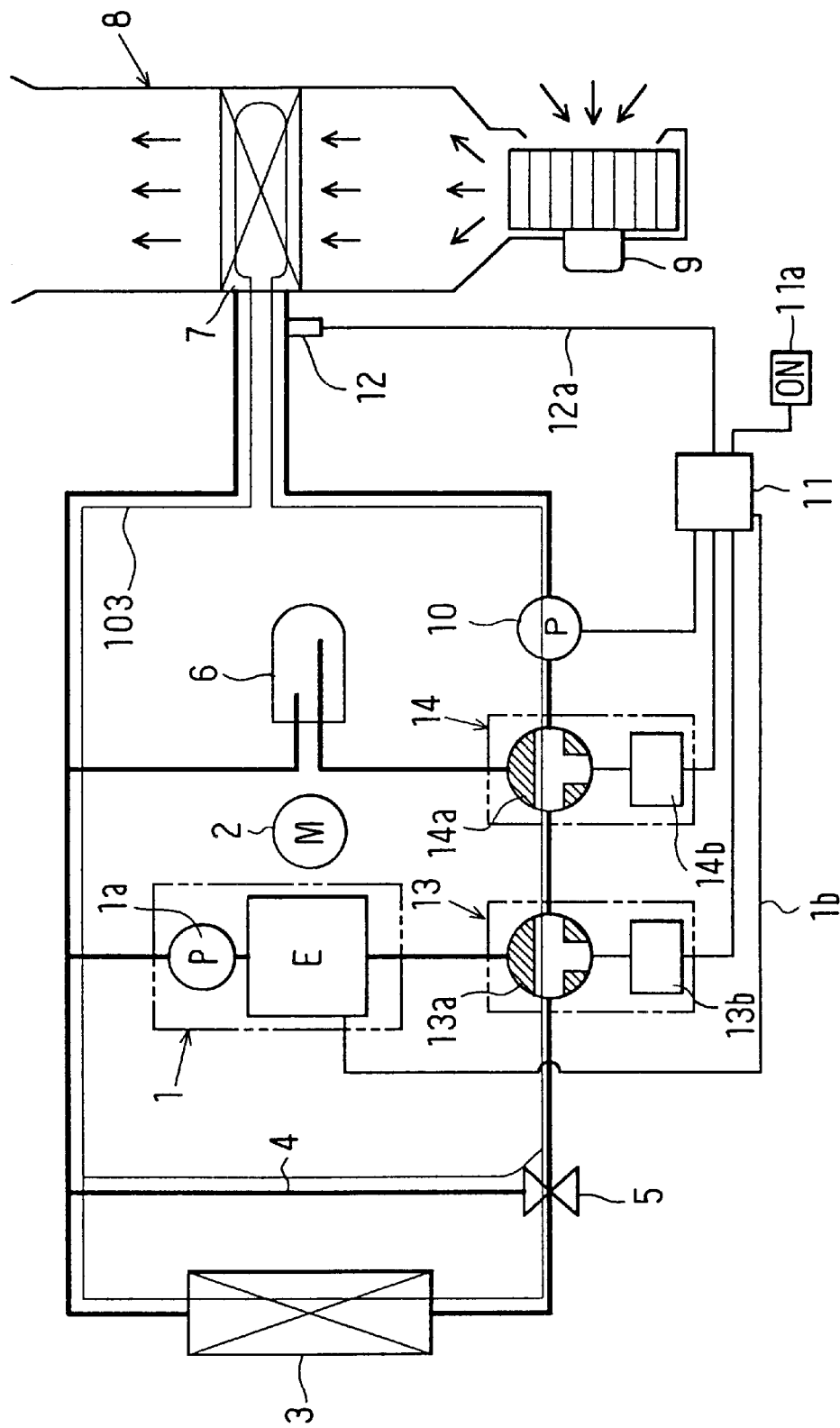
FIG. 3 is a schematic view showing a valve operation state B of the heating apparatus for the vehicle according to the first embodiment.

(2) Valve operation state B (see FIG. 3)

In this operation state, as shown in FIG. 3, the three positioning valves 13 and 14 are controlled such that the cooling water flows through the radiator 3 or the bypass circuit 4 and the heater core 7. More specifically, the cooling water returns in a second heating circuit 103 in which the cooling water from the heater core 7 returns through the radiator 3 or the bypass circuit 4 to the heater core 7.

Figure 4:
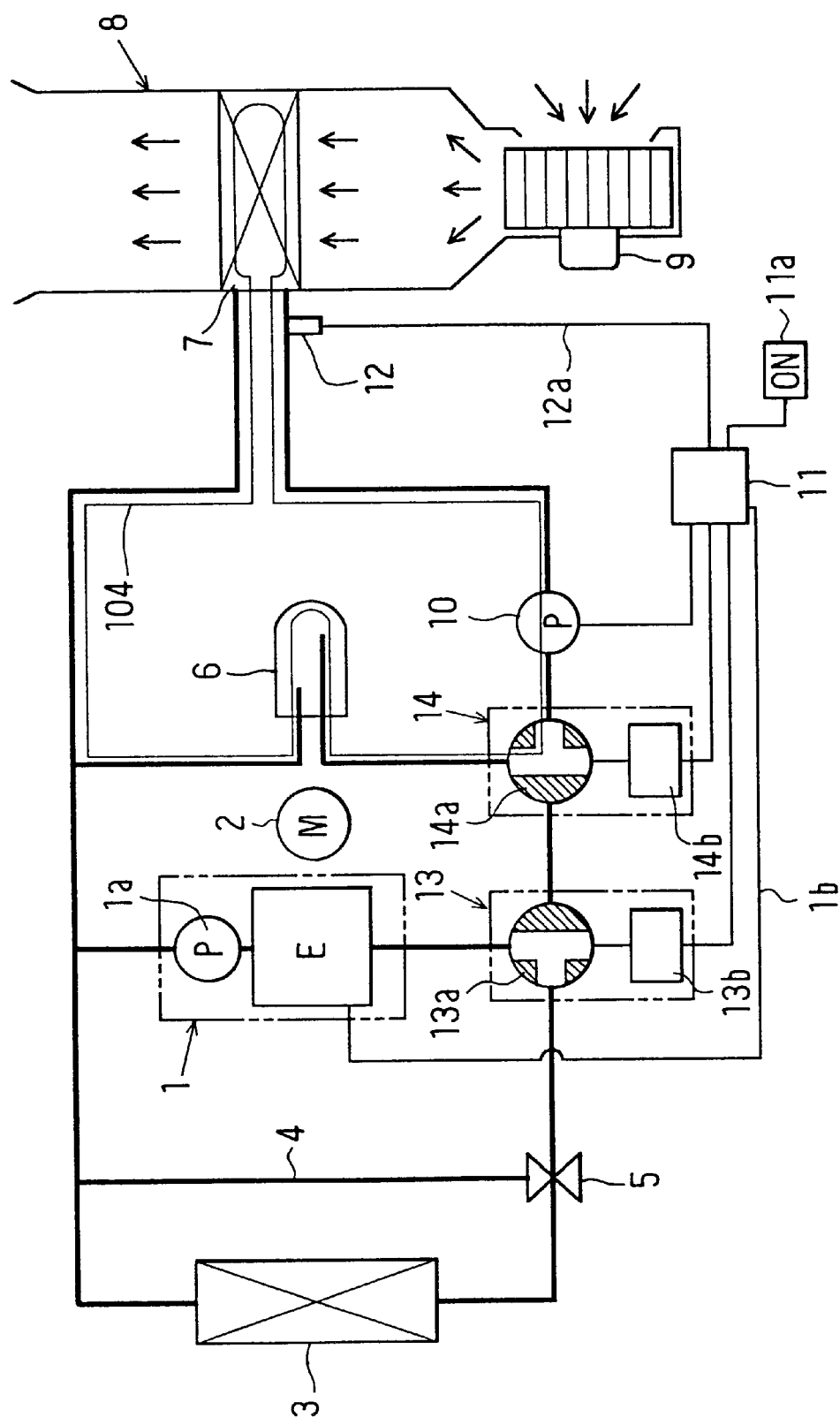
FIG. 4 a schematic view showing a valve operation state C of the heating apparatus for the vehicle according to the first embodiment.

(3) Valve operation state C (see FIG. 4)

In this operation state, as shown in FIG. 4, the three positioning valves 13 and 14 are controlled such that the cooling water flows through the heater core 7 and the heat accumulating tank 6. More specifically, the cooling water returns in a third heating circuit 104 in which the cooling water from the heater core 7 returns through the heat accumulating tank 6 to the heater core 7.

Figure 5:
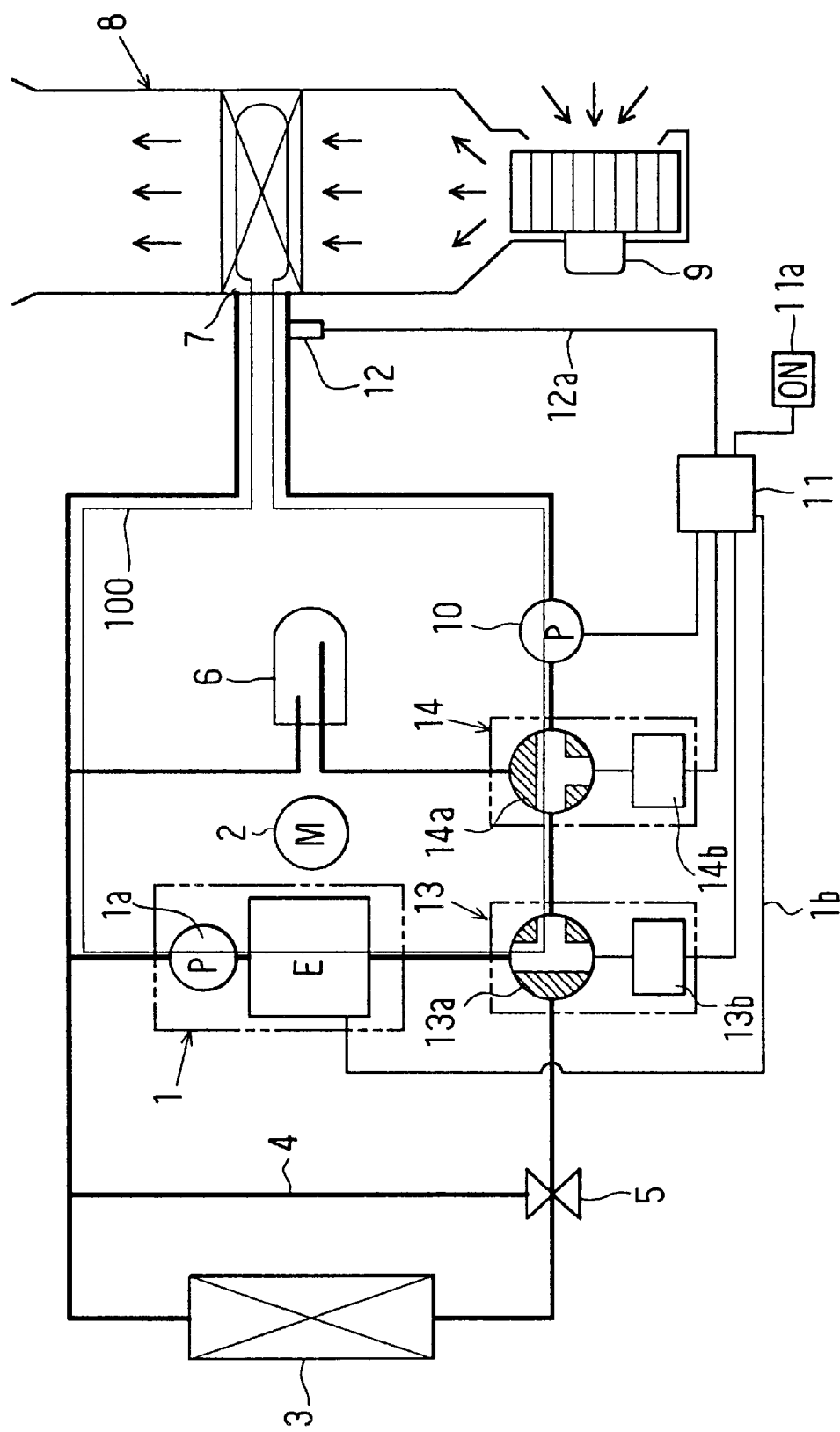
FIG. 5 a schematic view showing a valve operation state D of the heating apparatus for the vehicle according to the first embodiment.

(4) Valve operation state D (see FIG. 5)

In this operation state, as shown in FIG. 5, the three positioning valves 13 and 14 are controlled such that the cooling water flows only in the first heating circuit 100.

Next, an operation will be described with reference to a flow chart of FIG. 2.

When the heating apparatus for the vehicle is started by turning on a start switch 11a (see FIG. 1) at step S100, it is determined whether or not the temperature of the cooling water is over 80° C. (first predetermined temperature) based on a signal 12a from the temperature sensor 12 at step S105. When the temperature of the cooling water is equal to or less than 80° C., the three positioning valves 13 and 14 are operated in the valve operation state A at step S106. Then, it returns to step S105.

When it is determined that the temperature of the cooling water is over 80° C. at step S105, a flag is set for 0 (zero) at step S110, and it is determined whether or not the engine 1 is operating based on a signal 1b from the rotational sensor at step S120. When it is determined that the engine 1 is operating, the electric pump 10 is stopped at step S130, and the three positioning valves 13 and 14 are operated in the valve operation state A at step S140. Then, it returns to step s110.

On the other hand, when it is determined that the engine 1 stops at step S120, after the electric pump 10 is operated at step S150, it is determined whether the flag is equal to or more than 1 at step S160. When the flag is less than 1, the three positioning valves 13 and 14 are operated in the valve operation state B at step S170.

Then, it is determined whether or not the temperature of the cooling water is over 60° C. (second predetermined temperature) based on a signal 12a from the temperature sensor 12 at step S180. When the temperature of the cooling water is equal to or less than 60° C., the flag is set for 1 at step S190, and the three positioning valves 13 and 14 are operated in the valve operation state C at step S200.

Next, it is determined whether or not the temperature of the cooling water is over 60° C. (third predetermined temperature) based on a signal 12a from the temperature sensor 12 at step S210. When the temperature of the cooling water is equal to or less than 60° C., the flag is set for 2 at step S220, and the three positioning valves 13 and 14 are operated in the valve operation state D at step S230. Then, it returns to step S110.

On the other hand, when it is determined that the temperature of the cooling water is over 60° C. at step S180 or step S210, it returns to step S120.

When it is determined that the flag is equal to or more than 1 at step S160, it is determined whether or not the flag is equal to 1 at step S240. When the flag is equal to 1, it jumps to step S200, otherwise it jumps to step S230.

Features of this embodiment will be described.

After the vehicle has travelled a predetermined distance, when the engine in a warm state (in a state where the temperature of the cooling water is approximately 80° C.) is stopped while the heating operation is performed, the three positioning valves 13 and 14 are switched from the valve operation state A to B. Therefore, the cooling water is stopped flowing out of the engine 1, and the cooling water in the radiator 3 or the bypass circuit 4 is used as heating.

That is, since the cooling water stays in the engine 1 without flowing out of the engine 1, the engine 1 is suppressed from being cooled. Further, since the cooling water in the radiator 3 or the bypass circuit 4 is used as heating source, the heating operation can be continued even after the engine 1 is stopped.

Accordingly, it is possible to heat the passenger compartment continuously even after the engine 1 is stopped and to reduce the emission at the restarting of the engine 1 by suppressing the decrease in the temperature of the cooling water.

Before the high-temperature cooling water in the heat accumulating tank 6 is used, the cooling water in the radiator 3 or the bypass circuit 4 is used as heating source after the engine 1 is stopped. Therefore, it is possible to prolong a time where the heating operation can be performed as long as the cooling water in the radiator 3 or the bypass circuit 4 lowers.

Further, since the radiator 3 or the bypass circuit 4 is commonly used for heating without providing additional parts, it is possible to heat the passenger compartment continuously even after the engine 1 is stopped and to reduce the emission, while suppressing an increase of the manufacturing cost of the heating apparatus for the vehicle.

Figure 6:
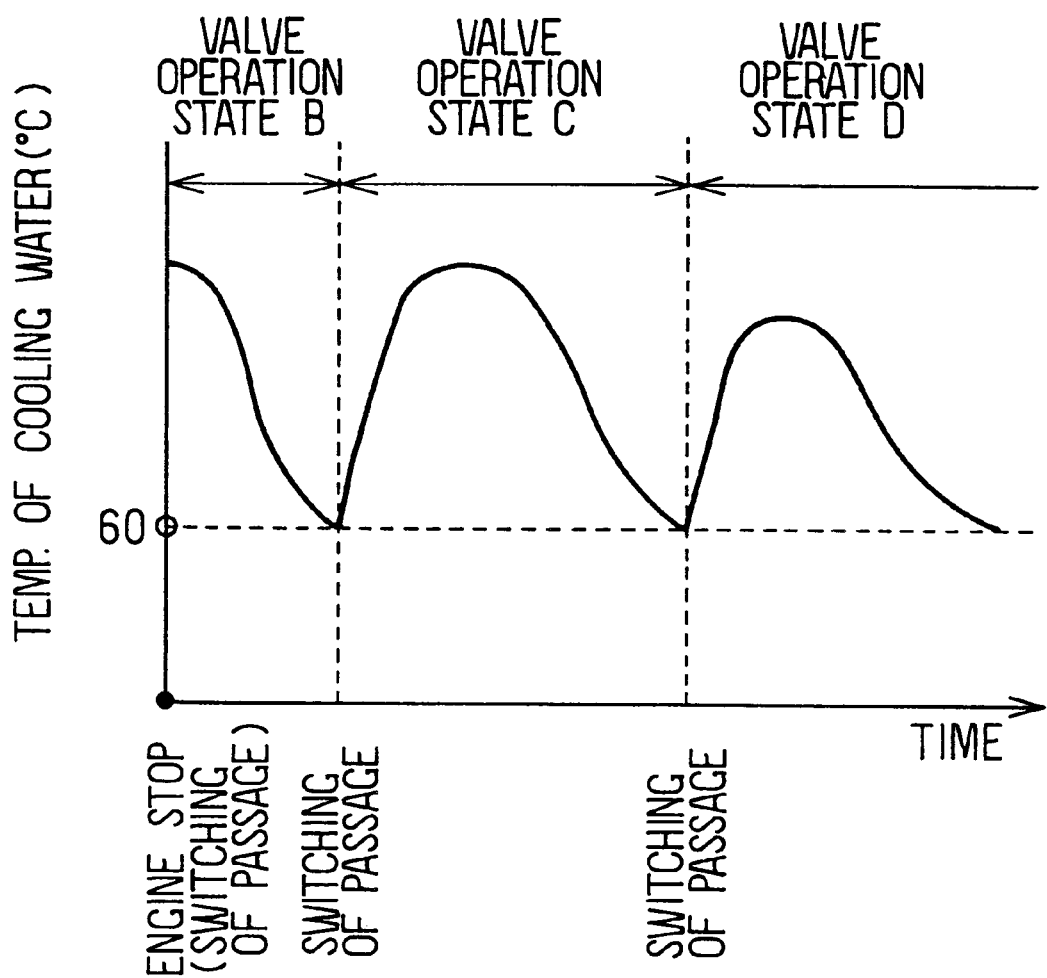
FIG. 6 is a graph a variation in a temperature of cooling water flowing through a heater core.

FIG. 6 shows a variation in the temperature of the cooling water at the inlet side of the heater core 7 when the valve operation state of the three positioning valves 13 and 14 are switched from B to C and from C to D after the engine 1 is stopped.

The reason why the switching determination conditions (the second and third predetermined temperatures) where the valve operation state of the three positioning valves 13 and 14 is switched from B to C or from C to D are set based on that the temperature of the cooling water is equal to 60° C. is as follows. According to examinations and studies by the inventors, in turns out that the emission increases when the temperature of the cooling water lowers less than 55° C. in general engines. By taking the radiation between the engine 1 and the inlet of the heater core 7 as well as the safety factor into the consideration for the temperature of the cooling water (55° C.), the switching determination condition (the temperature of the cooling water) is set for approximately 60° C.

Accordingly, the switching determination condition where the valve operation state of the three positioning valves 13 and 14 is switched is not always limited to the condition where the temperature of the cooling water is 60° C., but may be properly determined while considering the kind of the engine 1, the position where the temperature of the cooling water is detected, or the like. The switching determination condition may be changed every determination step.

The determination condition (the first predetermined temperature) at step S105 is not limited to the condition where the temperature of the cooling water is 80° C., but may be a temperature of the cooling water where the heating operation can be performed, which is higher than the above-described switching determination conditions (the second and third predetermined temperature).

Further, even if the engine is stopped, the three positioning valves 13 and 14 may be switched from the valve operation state A to B only when an instruction for continuing the heating operation by a switch or the like is made.

In this embodiment, the heater core 7 disposed directly in the air conditioning case 8 is employed as the heating heat exchanger; however, a water refrigerant heat exchanger (as shown in FIG. 2 of JP-A-5-221233) may be employed. In this case, the water refrigerant heat exchanger also functions as an evaporator of refrigerating cycle, and a condenser of the refrigerating cycle may be disposed in the air conditioning duct. Thus, the heating operation of the passenger compartment is performed by blowing air heated by the condenser.

A second embodiment of the present invention will be described.

Figure 7:
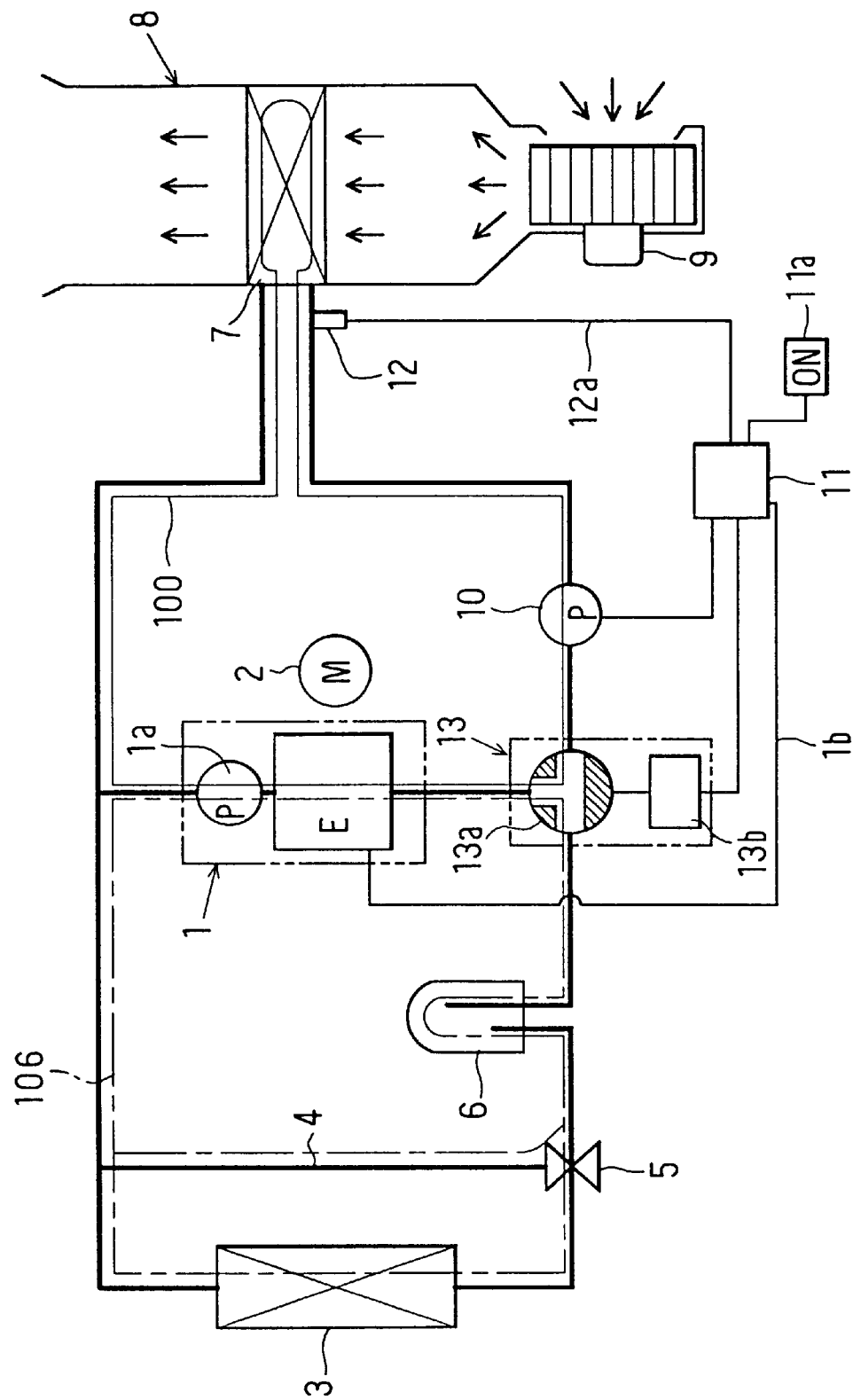
FIG. 7 a schematic view of the heating apparatus for a vehicle according to a second embodiment.
Figure 11:
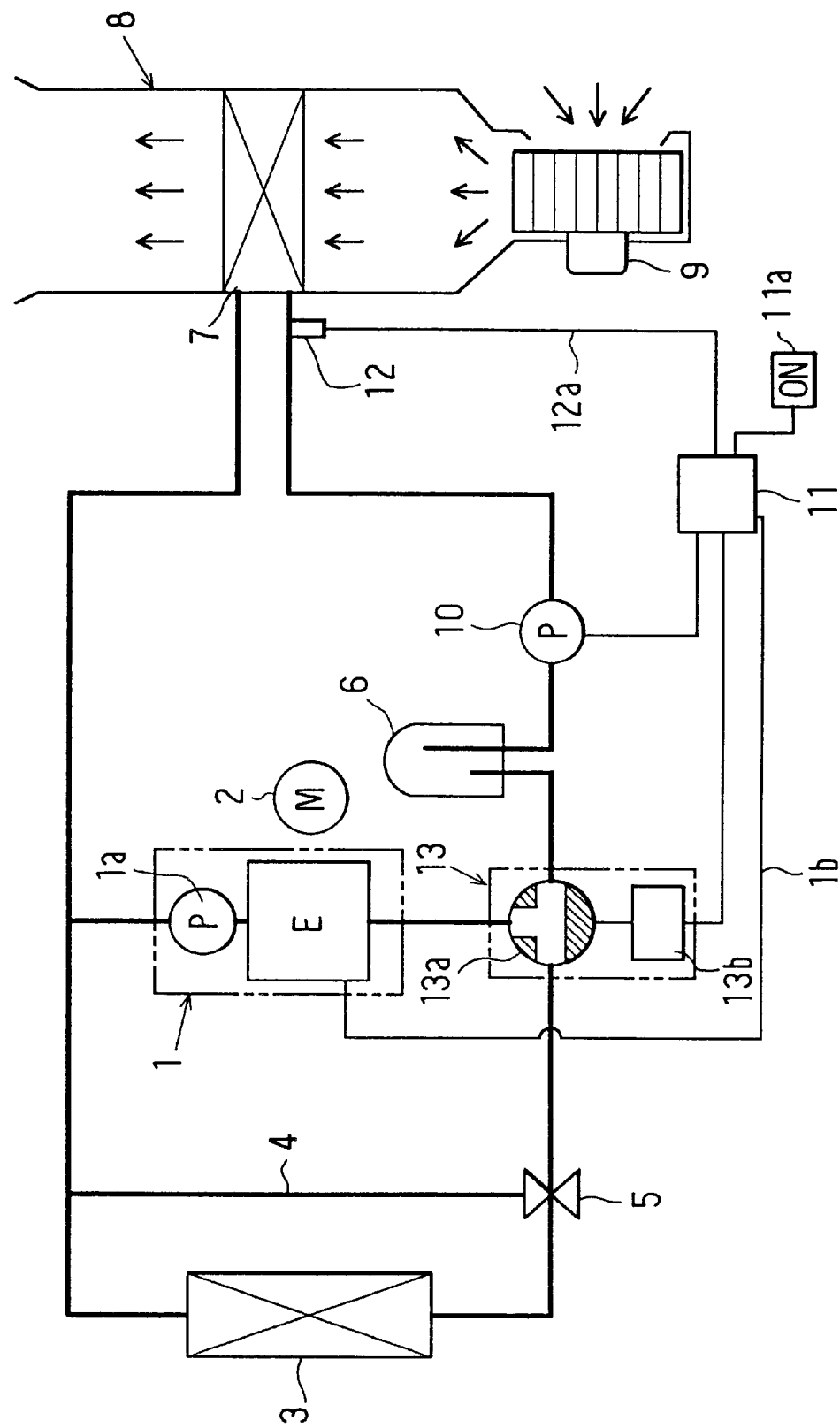
FIG. 11 is a schematic view showing a modification of the second embodiment.

An object of this embodiment is to simplify the heating apparatus for the vehicle. As shown in FIG. 7, in the second embodiment, the three positioning valve 14 is omitted, and the heat accumulating tank 6 is disposed between the thermostat 5 and the three positioning valve 13. The heat accumulating tank 6 may be disposed between the three positioning valve 13 and the heater core 7, as shown in FIG. 11.

Next, an operation of the present invention will be described. Prior to a specific description of the operation, the following terms are defined.

(1) Valve operation state E (see FIG. 7)

In this operation state, as shown in FIG. 7, the three positioning valve 13 is controlled such that the cooling water flows through all of the engine 1, the radiator 3 or the bypass circuit 4, the heat accumulating tank 6, and the heater core 7. More specifically, the cooling water returns simultaneously in the following two circuits.

That is, there are two circuits of a first heating circuit 100 in which the cooling water from the engine 1 returns through the heater core 7 to the engine 1, and a cooling circuit 106 in which the cooling water from the engine 1 returns through the heat accumulating tank 6, the radiator 3 or the bypass circuit 4 to the engine 1.

Figure 9:
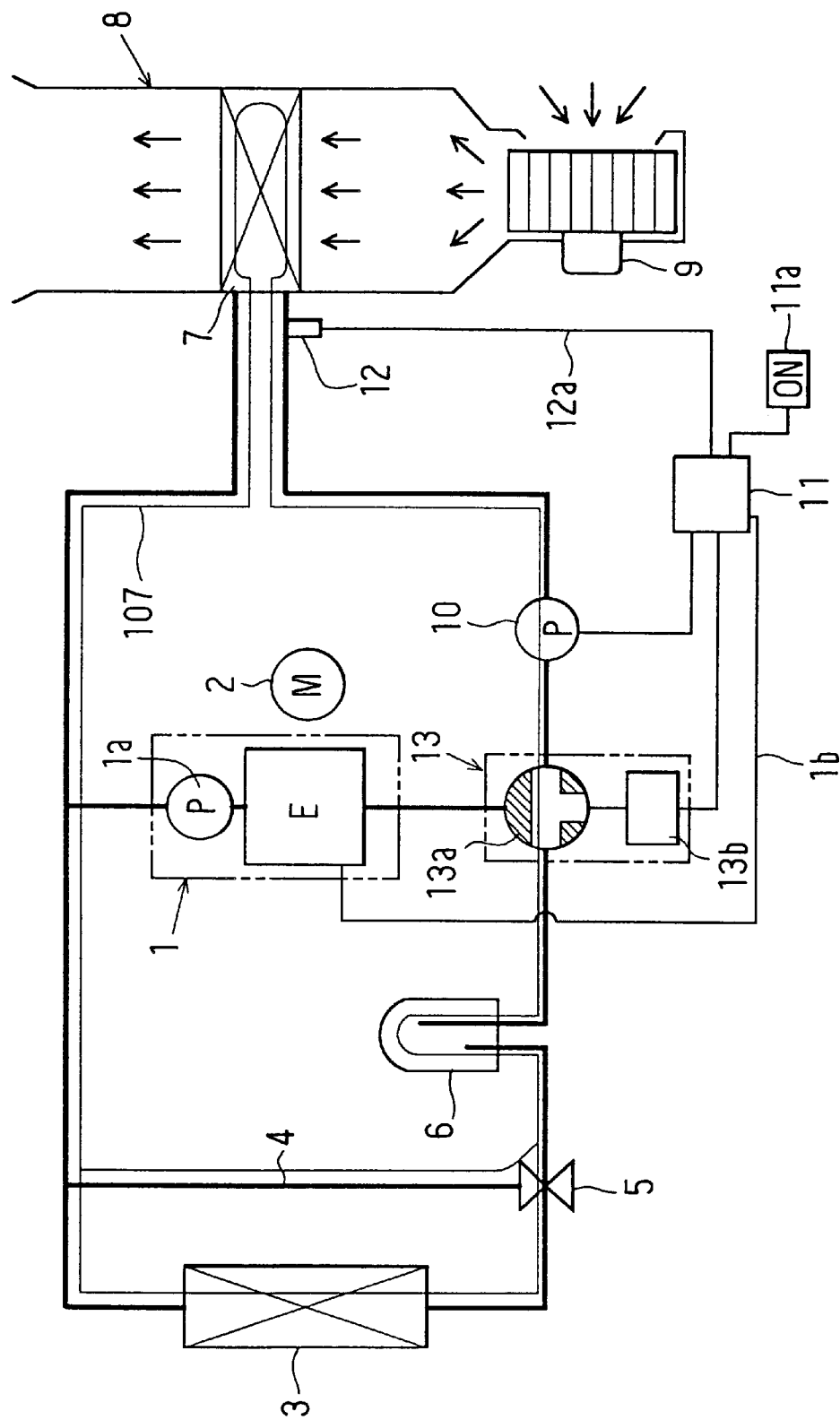
FIG. 9 is a schematic view showing a valve operation state F of the heating apparatus for the vehicle according to the second embodiment.

(2) Valve operation state F (see FIG. 9)

In this operation state, as shown in FIG. 9, the three positioning valve 13 is controlled such that the cooling water flows through the heat accumulating tank 6, the radiator 3 or the bypass circuit 4 and the heater core 7. More specifically, the cooling water returns in a fourth heating circuit 107 in which the cooling water from the heater core 7 returns through the heat accumulating tank 6, the radiator 3 or the bypass circuit 4 to the heater core 7.

Figure 10:
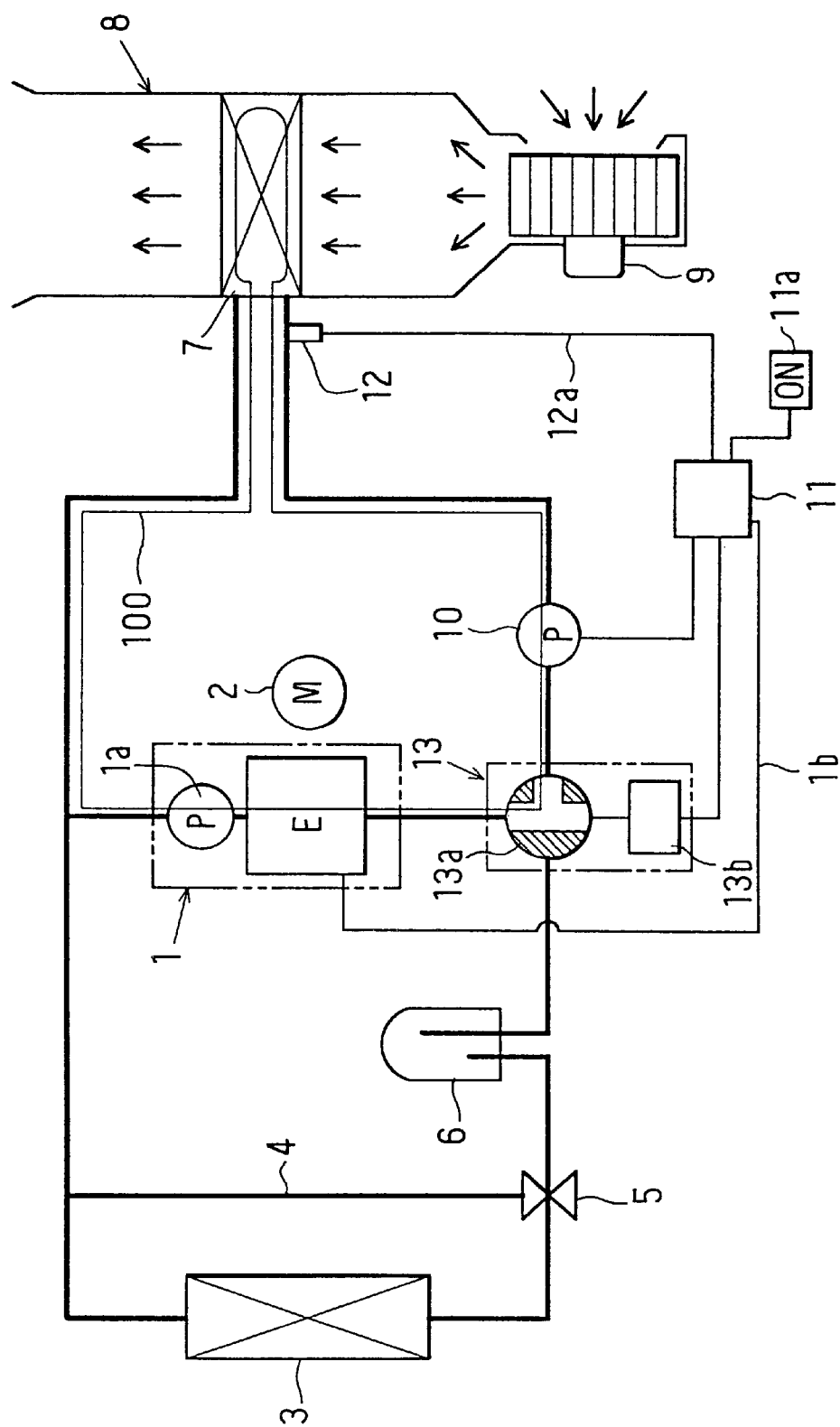
FIG. 10 is a schematic view showing a valve operation state G of the heating apparatus for the vehicle according to the second embodiment.

(3) Valve operation state G (see FIG. 10)

In this operation state, as shown in FIG. 10, the three positioning valve 13 is controlled such that the cooling water flows only in the first heating circuit 100.

Figure 8:
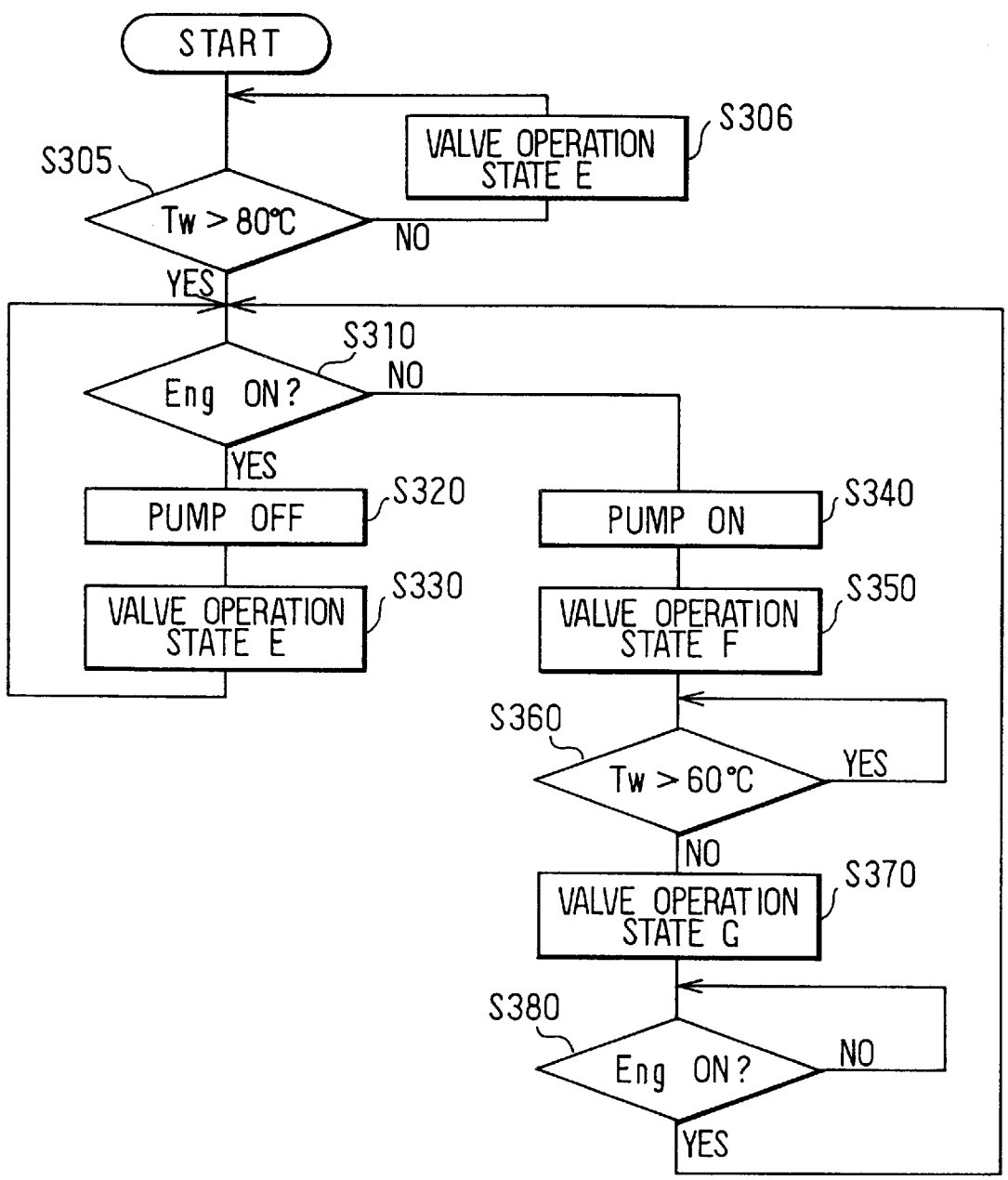
FIG. 8 is a flow chart showing an operation of the second embodiment.

An operation of this embodiment will be described with reference to a flow chart of FIG. 8.

When the heating apparatus for the vehicle is started by turning on a start switch 11a (see FIG. 1) at step S300, it is determined whether or not the temperature of the cooling water is over 80° C. (first predetermined temperature) based on a signal 12a from the temperature sensor 12 at step S305. When the temperature of the cooling water is equal to or less than 80° C., the three positioning valves 13 and 14 are operated in the valve operation state E at step S306. Then, it returns to step s305.

When it is determined that the temperature of the cooling water is over 80° C. at step S305, it is determined whether or not the engine 1 is operating based on a signal 1b from the rotational sensor at step S310. When it is determined that the engine 1 is operating, the electric pump 10 is stopped at step S320, and the three positioning valve 13 is operated in the valve operation state E at step S330. Then, it returns to step S310.

On the other hand, when it is determined that the engine 1 stops at step S120, after the electric pump 10 is operated at step S340, the three positioning valve 13 is operated in the valve operation state F at step S350.

Next, it is determined whether or not the temperature of the cooling water is over 60° C. (fourth predetermined temperature) based on a signal 12a from the temperature sensor 12 at step S360. When the temperature of the cooling water is equal to or less than 60° C., the three positioning valve 13 is operated in the valve operation state G at step S370. Then, it is determined whether or not the engine 1 is operating based on a signal 1b from the rotational sensor at step S380. When it is determined that the engine 1 stops, it returns to step S380, and the three positioning valve 13 is maintained in the valve operation state G. When it is determined that the engine 1 is operating, it returns to step S310.

Similar to the first embodiment, the determination condition at step S380 is not always limited to the condition where the temperature of the cooling water is 60° C., but may be properly determined while considering the kind of the engine 1, the position where the temperature of the cooling water is detected, or the like.

Features of this embodiment will be described.

After the vehicle has travelled a predetermined distance, when the engine in a warm state (in a state where the temperature of the cooling water is approximately 80° C.) is stopped while the heating operation is performed, the heating operation is performed by using the cooling water in the heat accumulating tank 6, and the radiator 3 or the bypass circuit 4. Therefore, it is possible to heat the passenger compartment continuously by using the heater core 7 even after the engine 1 is stopped and to reduce the emission at the restarting of the engine 1 by suppressing the decrease in the temperature of the cooling water.

In this embodiment, the heat accumulating tank 6 is disposed between the thermostat 5 and the three positioning valve 13. Therefore, when the cooling water staying in the engine 1 is introduced into the heater core 7 (the three positioning valve is in the operation state G) after the temperature of the cooling water in the heat accumulating tank 6 lowers, the cooling water in the heater core 7, a temperature of which lowers, is not mixed into the cooling water flowing in the heater core 7. Accordingly, as compared with when the heat accumulating tank 6 is disposed between the three positioning valve 13 and the heater core 7, it is possible to employ the cooling water staying in the engine 1 effectively as the heating source of the heating operation.

In the above embodiments, the switching determination condition where the valve operation state of the three positioning valves 13 and 14 is switched is constant (the temperature of the cooling water is equal to 60° C.); however, such a condition may be changed every determination step while considering the elapsed time after the engine stops, a temperature of the outside air, a temperature of the passenger compartment or the like.

A third embodiment of the present invention will be described.

Figure 12:
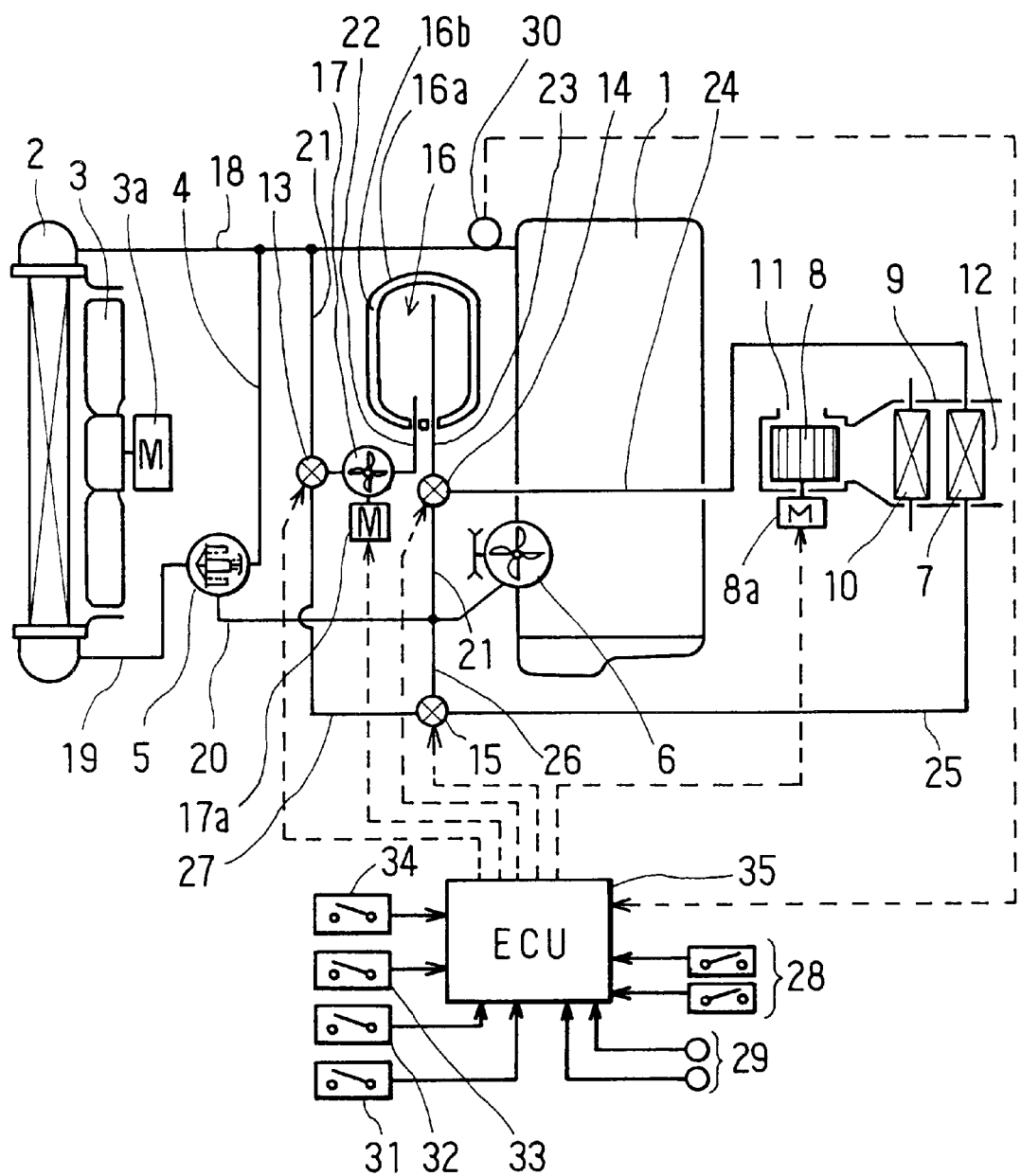
FIG. 12 shows circuits of cooling water in a water-cooled engine according to a third embodiment.
Figure 13:
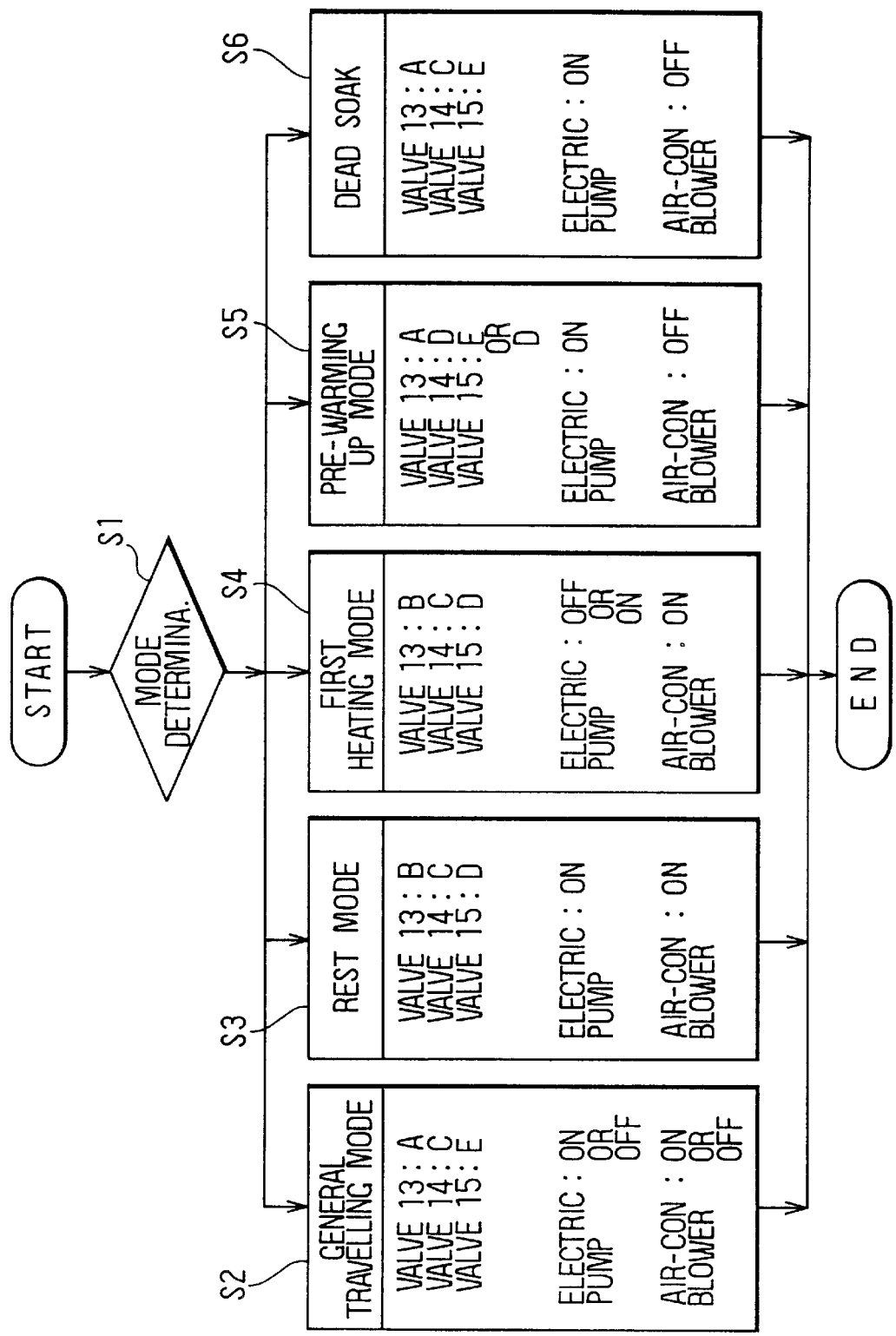
FIG. 13 is a flow chart showing a summary of an operation executed by an ECU of FIG. 12.

In FIG. 12, a radiator 2 performs a heat exchange between cool air blown from a cooling fan 3 and cooling water of a water-cooled engine (internal combustion engine) 1 for running a vehicle. The cooling fan 3 is constructed by an electric axial fan driven by a motor 3a.

The bypass circuit 4 is formed in parallel with the radiator 2. A thermostat 5 controls a flow of the cooling water flowing into the radiator 2 or the bypass circuit 4. The thermostat 5 shifts a valve body (not shown) by using a variation in a volume of a thermo-wax in accordance with a temperature so that the cooling water passages are switched.

More specifically, when the temperature of the cooling water is low, the thermostat 5 opens a passage at the side of the bypass circuit 4. When the temperature of the cooling water rises higher than a predetermined temperature (for example, 80° C.), the thermostat 5 opens a passage at the side of the radiator 2 so that the cooling water flows toward the radiator 2 to cool the cooling water therein.

A mechanical water pump 6 (hereinafter referred to as "mechanical pump") pumps the cooling water circulating in the cooling water circuit of the engine 1. The mechanical pump 6 is mechanically operated while a rotation of a crankshaft of the engine 1 is transmitted thereto.

A heating heater core 7 (heating heat exchanger) of an air conditioning apparatus for a vehicle heats conditioned air blown out from an air conditioning blower (hereinafter referred to as "blower") by performing a heat exchange with the cooling water. The heating heater core 7 (hereinafter referred to as "heater core") is disposed at an air downstream side of a cooling evaporator in an air flow passage of an air conditioning duct 9 to control a temperature of air blown out into the passenger compartment by reheating cool air cooled in the cooling evaporator 10 up to a predetermined temperature. The blower 8 is constructed by an electric centrifugal fan driven by a motor 8a.

An air inlet 11 is for sucking air through an inside air/outside air switching box (not shown), and an air outlet 12 is for blowing out air, a temperature of which is controlled in the heater core 7, into the passenger compartment. The air outlet 12 includes a face air outlet for blowing air toward a head portion of a passenger, a foot air outlet for blowing out air toward feet of the passenger, a defroster air outlet for blowing air toward a windshield glass, and the like.

Each of electric control valves 13, 14 and 15 is of a three positioning type and controls a flow of the cooling water by switching the cooing water circuit. Each of these electric control valves 13, 14 and 15 accommodates therein a rotatable rotary type valve body (not shown) and selects a rotational position of the rotary type valve by an electric actuator such as a servo-motor and an electromagnetic mechanism so that the cooling water circuit is switched as shown in FIG. 4.

In this embodiment, a reheat type temperature control system is employed. That is, an opening degree of a valve body (not shown) of the control valve 14 or 15 of these control valves 13, 14 and 15 is adjusted so that an amount of the cooling water flowing into the heater core 7 is controlled. In this way, a reheating amount of the air by the heater core 7 is controlled, and a temperature of the air blown out is controlled.

A heat accumulating tank 16 has a double tank structure made of metal which is superior in the corrosion resistance such as stainless, and an intermediate space 16b is evacuated to form a heat insulating structure. An electric water pump 17 (hereinafter referred to as "electric pump") is driven by a motor 17a.

Through main cooling water circuits 18, 19 and 20, the cooling water returns between the engine 1 and the radiator 2 by the mechanical pump 6. Through heat accumulating cooling water circuits 21, 22 and 23, the high-temperature cooling water immediately flowed out of the engine 1 returns into the heat accumulating tank 16. The heat accumulating cooling water circuit 22 forms an inlet circuit into the heat accumulating tank 16, and is open to a bottom portion of the heat accumulating tank 16. The heat accumulating cooling water circuit 23 forms an outlet circuit from the heat accumulating tank 16, and is open to a ceiling portion of the heat accumulating tank 16. Through heater circuits 24 and 25, the cooling water returns into the heater core 24 and 25. Through return circuits 26 and 27, the cooling water returns to the engine 1.

A group of air conditioning switches 28 is provided on a control panel (not shown) of the air conditioning apparatus for the vehicle and includes an air conditioning switch for starting an operation of an air conditioning compressor (not shown), a temperature setting switch for setting a target temperature, an air outlet mode switch, a control switch of the blower 8, and the like. A group of sensors 29 for automatically controlling the air conditioning apparatus for the vehicle includes an inside air temperature sensor for detecting a temperature in the passenger compartment, an outside air temperature sensor for detecting a temperature of outside air, a sunlight amount sensor for detecting an amount of sunlight, an evaporator temperature sensor for detecting a cooling temperature of the evaporator 10, and the like.

A water temperature sensor 30 for detecting a temperature of the cooling water is disposed at an outlet portion of the cooling water in the engine 1, and is made of a temperature sensitive element such as a thermistor.

An ignition switch 31 is for supplying an electricity to an ignition circuit of the engine 1.

A pre-warming up switch 32 is for setting a pre-warming up mode. A fast heating switch is for setting a fast heating mode. A rest mode switch 34 is for setting a rest mode. Each of these switches 31–34 is provided around an instrumental panel (not shown) and is manually operated. The switches 32–34 may be provided with a group of the air conditioning switches 28 in the control panel of the air conditioning apparatus.

An electric control unit (ECU) 35 is composed of a micro-computer and peripheral circuits thereof. The electric control unit 35 performs determinations and calculating processes based on input signals input from the group of air conditioning switches 28, the group of sensors 29, the water temperature sensor 30, and each of switches 31–34 in accordance with pre-stored programs, and controls each operation of the blower 8, the control valves 13, 14 and 15, the electric pump 17, and the like.

Next, an operation of the present invention will be described. FIG. 2 shows a summary of a control flow executed in the electric control unit 35 in this embodiment. When the electric source circuit of the electric control unit 35 is electrically connected to a battery (not shown) mounted on the vehicle, the control flow is started, and a mode determination is performed at step S1 based on the following Table 1.

In Table 1, a mode determination is performed based on an ON/OFF state of the ignition switch 31, a temperature of the cooling water, detected by the water temperature sensor 30, and each ON/OFF state of the pre-warming up switch 32, the fast heating switch 33, and the rest mode switch 34. While the ignition switch 31 is ON, when the temperature of the water is equal to or more than a predetermined value T1 (e.g., 50° C.) as a standard of a completion of the warming-up operation of the engine, a general travelling mode is selected at step S1.

TABLE 1

| MODE | IGNITION SWITCH | WATER TEMP. | REST MODE SWITCH | FAST HEATING SWITCH | PRE-WARMING UP SWITCH |
|---|---|---|---|---|---|
| GENERAL TRAVELLING | ON | EQUAL TO or MORE THAN T1 | OFF | OFF | OFF |
| REST MODE | OFF | ↑ | ON | OFF | OFF |
| FAST HEATING | ON or OFF | LESS THAN T1 | OFF | ON | OFF |
| PRE-WARMING UP | OFF | ↑ | OFF | OFF | ON |
| DEAD SOAK | OFF | EQUAL TO or MORE THAN T2 | OFF | OFF | OFF |

When the general travelling mode is selected, the valves 13, 14 and 15 are operated in the states A, C and E shown in Table 1, respectively. In this way, the cooling water flows in the order of the engine 1, the valve 13, the electric pump 17, the heat accumulating tank 16, the valve 14, the heater core 7, the valve 15, and the mechanical pump 6, and is returned to the engine 1.

In this general travelling mode, when it is determined based on switch input signals from a temperature setting switch in the group of the switches 28 provided in the air conditioning control panel, the blower control switch, and the like, or sensor signals from the group of the air conditioning sensors 29 that it is necessary to heat the passenger compartment, the blown-out air is heated in the heater core 7 by operating the electric pump 17 and the blower 8 to heat the passenger compartment.

In the heating operation, a rotational position of the valve 14 or 15 is adjusted to adjust an opening degree of the cooling water passage into the heater core 7. In this way, an amount of the cooling water flowing into the heater core 7 is changed, and the heating capacity can be adjusted.

The control of the cooling water flowing in the main circuits 18, 19 and 20 including the radiator 2 or in the bypass circuit 4 is the same as the conventional operation, the explanation is omitted herein.

When the driver turns off the ignition switch 31 and stops the engine 1 (e.g., when the vehicle is stopping to wait for the traffic lights to change) and the rest mode switch 34 is turned on, a condition of the rest mode in Table 1 is satisfied, because the temperature of the cooling water is equal to or higher than the predetermined value T1 immediately after the engine 1 stops.

Therefore, the rest mode is selected at step S1, and the valves 13, 14 and 15 are operated in the states B, C and F of FIG. 24, respectively. In this way, the cooling water flows in the order of the valve 13, the electric pump 17, the heat accumulating tank 16, the valve 14, the heater core 7, and the valve 15, and is returned to the valve 13.

In this rest mode, the electric pump 17 and the air conditioning blower 8 are always operated.

In this way, the cooling water returns only between the heat accumulating tank 16 and the heater core 7. The air blown out by the air conditioning blower 8 is heated in the heater core 7 to be warm air, and is blown out into the passenger compartment. Therefore, it is possible to heat the passenger compartment continuously even while the engine 1 is stopped. Since the heating operation in the rest mode is performed by using the high-temperature cooling water accumulated in the heat accumulating tank 16, the temperature of the cooling water in the engine 1 does not lower even when the radiation of the cooling water in the heater core 7 occurs.

Accordingly, there is no occurrence of a problem in that a starting performance deteriorates at the following starting (re-starting) of the engine due to the decrease in the temperature of the cooling water in the engine 1. As a result, it is possible to maintain the heating feeling during the stopping of the engine and to prevent the re-starting performance of the engine from deteriorating.

Next, immediately after the engine is started or while the engine stops, when the temperature of the cooling water is less than a predetermined value T1 (50° C.) and the fast heating switch 33 is turned on, a condition of the fast heating mode in Table 1 is satisfied. Therefore, the fast heating mode is selected at step S1, and the valves 13, 14 and 15 are operated in the states B, C and F shown in FIG. 24, respectively. In this way, the cooling water flows, similar to the rest mode, in the order of the valve 13, the electric pump 17, the heat accumulating tank 16, the valve 14, the heater core 7 and the valve 15, and is returned to the valve 13.

In this fast heating mode, the electric pump 17 and the air conditioning blower 8 are always operated.

In this way, the cooling water returns only between the heat accumulating tank 16 and the heater core 7 by the electric pump 17, and the air blown out by the air conditioning blower 8 is heated in the heater core 7 to be warm air and is blown out into the passenger compartment. Therefore, even when the temperature of the cooling water is low, it is possible to heat the passenger compartment. Since the heating operation in the fast heating mode is also performed by using the high-temperature cooling water accumulated in the heat accumulating tank 16, the temperature of the cooling water in the engine 1 does not lower even when the radiation of the cooling water in the heater core 7 occurs.

The amount of the high-temperature cooling water accumulated in the accumulating tank 16 is limited; and therefore, to prolong the time where the heating operation can be performed in the rest mode or the fast heating mode, it is preferable that each rotational speed of the electric pump 17 and the air conditioning blower 8 is set for a lower value (low side).

Next, while the engine stops, when the temperature of the cooling water is less than a predetermined value T1 (50° C) and the pre-warming up switch 32 is turned on, a condition of the pre-warming up mode in Table 1 is satisfied.

Therefore, the pre-warming up mode is selected at step S1, and the valves 13 and 14 are operated in the states A and D shown in FIG. 24, respectively. In this way, the cooling water flows in the order of the engine 1, the valve 13, the electric pump 17, the heat accumulating tank 16, the valve 14 and the mechanical pump 6, and is returned to the engine 1. Thus, in the pre-warming up mode, since there is formed the circuit without passing through the valve 15, the valve 15 may be operated in either one of the states E and F.

In the pre-warming up mode, the electric pump 17 is always operated whereas the air conditioning blower 8 is maintained to be stopped.

In this way, the high-temperature cooling water accumulated in the heat accumulating tank 16 returns in the engine 1 by the electric pump 17 so that it is possible to pre-warm up the engine 1 before the engine 1 is started. Therefore, even when it is cold as in winter season, it is possible to start the engine 1 easily.

In the general travelling mode, when the temperature of the cooling water is less than a predetermined value T1 (50° C.) and the pre-warming up switch 33 is not turned on, the valves 13 and 14 are operated by the control unit 35 in the same manner as in the pre-warming up mode so that the cooling water returns between the engine 1 and the heat accumulating tank 16.

In summer season, the cooling water for cooling the water-cooled engine 1 flowed out of the engine 1 returns in the main circuits 18, 19 and 20 in which the cooling water flows through the radiator 2, the thermostat 5 and the mechanical pump 6 and returns to the engine 1. At this time, the thermostat 5 fully opens between the main circuits 19 and 20. Cooling air is compulsorily blown by an operation of the cooling fan 3 toward the radiator 2 to cool the cooling water.

When the vehicle travels with high load in summer season, e.g., the vehicle travels on the slope with low speed in the high-temperature outside air, an amount of heat generated by the engine 1 increases, and the temperature of the air flowing into the radiator 2 is high. Therefore, the cooling capacity of the radiator 2 is likely to be insufficient. As a result, in general, the temperature of the cooling water is extremely high, and is likely to be over 100° C.

As described above, immediately after the vehicle has travelled with high load in summer season, when the vehicle is stopped and the ignition switch 18 is turned off to stop the engine 1 (at the time of so-called "dead soak"), the cooling fan 3 is stopped and the cooling function of the radiator 2 is also stopped. Therefore, there occurs a phenomenon that the temperature of the cooling water rises excessively by the heating amount of the engine 1.

In this embodiment, when the OFF signal of the ignition switch 18 is input (when the engine 1 is stopped), if the temperature of the cooling water of the engine 1, detected by the water temperature sensor 30, is equal to or more than a second predetermined temperature T2 (100° C. which corresponds to the abnormal high-temperature in this embodiment), a dead soak mode is selected at step S1, and the valves 13, 14 and 15 are operated in states A, C and E shown in FIG. 24. In this way, the cooling water flows in the order of the engine 1, the valve 13, the electric pump 17, the heat accumulating tank 16, the valve 14, the heater core 7, the valve 15 and the mechanical pump 6, and is returned to the engine 1.

In the dead soak mode, the electrical pump 17 is always operated whereas the air conditioning blower is maintained to be stopped.

In this way, the low-temperature cooling water stored in the heater core 7 is introduced into the engine 7 by the electric pump 17 to absorb the heat of the engine 1 effectively, and it is possible to certainly prevent the temperature of the cooling water from rising excessively due to the dead soak.

The reason why the low-temperature cooling water is stored in the heater core 7 is as follows:

That is, when the vehicle travels in summer season, the cooling operation of the passenger compartment is performed by the evaporator 10 of the air conditioning apparatus. At this time, the valve 14 is operated in the full closed position D where the cooling water flowing into the heater core 7 is completely interrupted, i.e, the maximum cooling position (max cool position), or in a minute opening degree position (a position close to the maximum cooling operation) where the a minute amount of the cooling water flows into the heater core 7.

Accordingly, no cooling water flows into the heater core 7 or only a minute amount of the cooling water flows into the heater core 7. Further, since the cool air cooled in the evaporator 10 passes through the heater core 7, the cooling water in the heater core 7 and in the cooling water circuits 24 and 25 before and after the heater core 7 is maintained at a low-temperature state as compared with the cooling water in the main circuits 18, 19 and 20.

Thus, since the low-temperature cooling water at the side of the heater core 7 returns toward the engine 1, it is possible to effectively prevent the temperature of the cooling water from rising excessively at the time of the dead soak, and also possible to make uniform temperature distributions in each of parts of the cooling water circuit. Therefore, design standards of pressure tightness or heat resistance in each of parts of the cooling water circuits can be softened, and the manufacturing costs can be reduced.

In the above-described embodiment, the rest mode is performed when the rest mode switch 34 is manually turned on. However, for example, when the temperature of the outside air is equal to or less than a predetermined value (when it is cold and the heating operation is required) and the water temperature is equal to or more than the predetermined value T1 while the ignition switch 31 is turned off (while the engine stops), by detecting such a condition with the control unit 35, the rest mode may be performed automatically. While the rest mode switch 34 is turned on, even if the ignition switch 31 is turned on (e.g., (e.g., when the vehicle is stopping to wait for the traffic lights to change), the rest mode may be performed.

Further, in the rest mode and the fast heating mode, by detecting the temperature of the cooling water circulating between the heat accumulating tank 16 and the heater core 17 with a temperature sensor, when the temperature of the cooling water lowers to the extent that the heating operation of the passenger compartment cannot be performed, the rest mode or the fast heating mode may be automatically stopped by the control unit 35.

As the temperature control system of the air conditioning apparatus shown in FIG. 12, the reheat type in which the temperature of the air blown out into the passenger compartment is controlled by adjusting an amount of the cooling water flowing into the heater core 7 is described; however, the present invention can be employed in an air mixing type air conditioning apparatus in which the bypass passage is formed at the side of the heater core 7 and the temperature of the air blown out into the passenger compartment is controlled by adjusting a ratio between an amount of air flowing into the bypass passage and an amount of the air flowing into the heater core 7.

A fourth embodiment of the present invention will be described.

Figure 14:
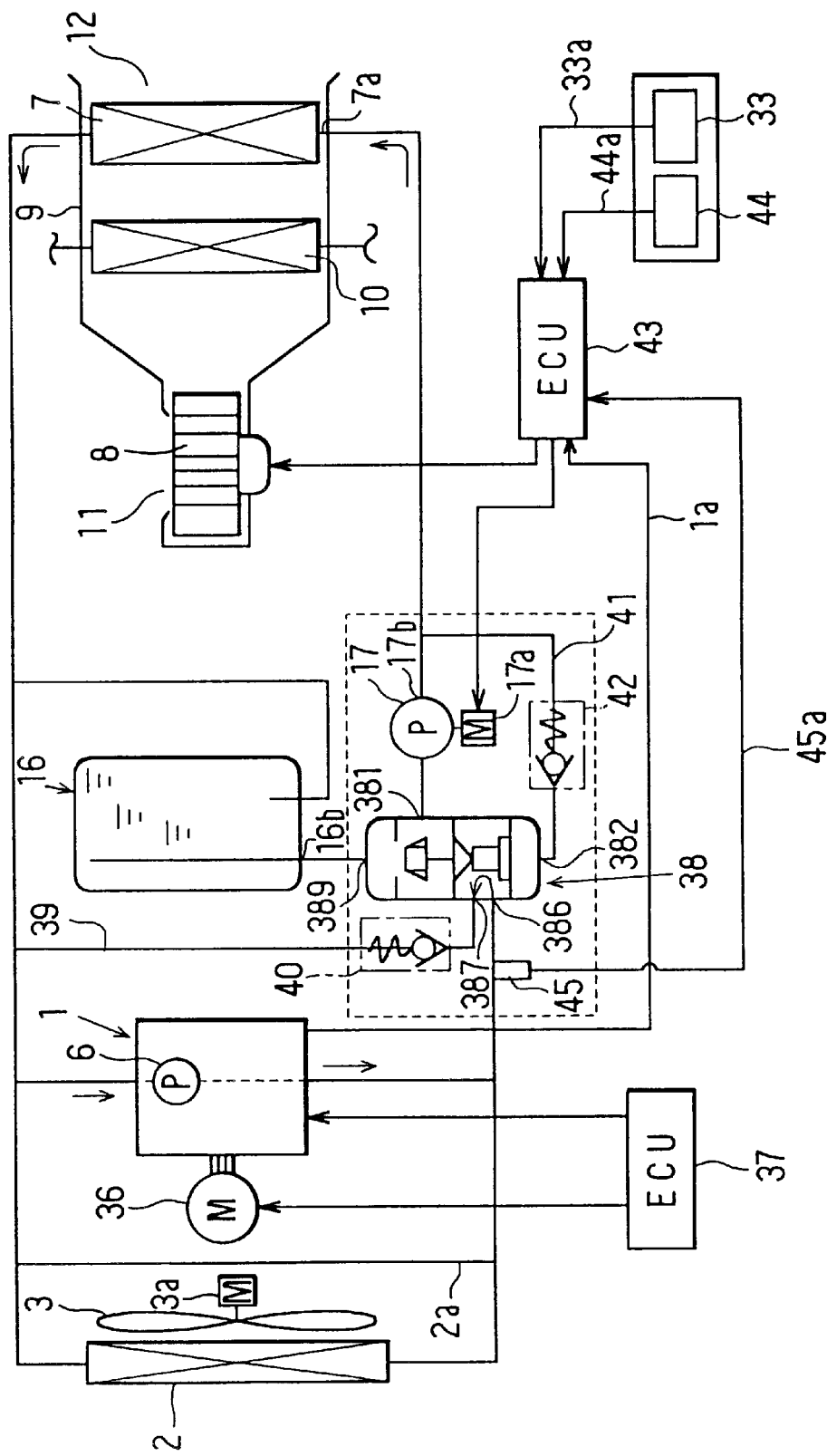
FIG. 14 is a schematic view showing an air conditioning apparatus for a vehicle according to a fourth embodiment.

In FIG. 14, an air conditioning apparatus according to the fourth embodiment is employed in a hybrid vehicle. An electric motor 36 is rotated while receiving an electric power from a battery mounted on the vehicle. A control unit 36 for running the vehicle switches between the electric motor 36 and the engine 1 when the vehicle is travelling.

The hybrid type vehicle generally runs with a motor driven by an electric power charged in a battery. When the electric power charged in the battery lowers less than a predetermined value, the vehicle runs with an engine to generate electricity and to charge the battery. When the electric power charged in the battery recovers up to the predetermined value, the vehicle runs with the motor again.

The cooling water circuits are formed such that the engine 1, the radiator 2, the heater core 7, and the heat accumulating tank 16 are connected in parallel with each other as shown in FIG. 14. In the cooling water circuit leading from the engine 1 to the heater core 7 and the heat accumulating tank 16, there is disposed a control valve 38 which mechanically controls a flow of the cooling water by using an expansion of a wax in a wax box (described later). The control valve 38 is of the so-called thermostat type which controls a flow of the cooling water in accordance with a temperature of the cooling water flowing in the control valve 38. A radiator bypass circuit 2*a* bypasses the radiator 2, and the radiator bypass circuit 2*a* is generally incorporated within the engine 1.

FIG. 14 schematically shows a structure of the control valve 38, and a detailed structure thereof will be described later.

A returning bypass circuit 39 is for returning water flowed in the control valve 38 to the engine 1. In the returning bypass circuit 39, there is provided a first check valve 40 for preventing the cooling water in the returning bypass passage 39 from flowing into the control valve 38.

In the control valve 38, there are formed a first outlet 381 and a second outlet which communicate with an inlet 7*a* of the heater core 7. An electric pump 17 is disposed between the first outlet 381 and the inlet 7*a* of the heater core 7.

The second outlet 382 communicates with a pump bypass path 41 which leads to a discharge outlet 17*b* of the electric pump 17 to bypass the electric pump 17. In the pump bypass path 41, there is provided a second check valve 42 for preventing the cooling water in the inlet 7*a* of the heater core 7 from flowing into the second outlet 382.

A motor 8*a* of the blower 8 and a motor 17*a* of the electric pump 17 are controlled by a control unit 43. To the control unit 43 input a signal la from a rotational sensor (not shown) for detecting a rotational speed of the engine 1, a signal 44*a* from a starting switch 44 by which a passenger starts an operation of the air conditioning apparatus for a vehicle, a signal 33*a* from a fast heating switch 33, and a signal 44*a* from a water temperature sensor 45 disposed at an upstream side an outlet 386 of a control valve 38(described later).

Figure 15:
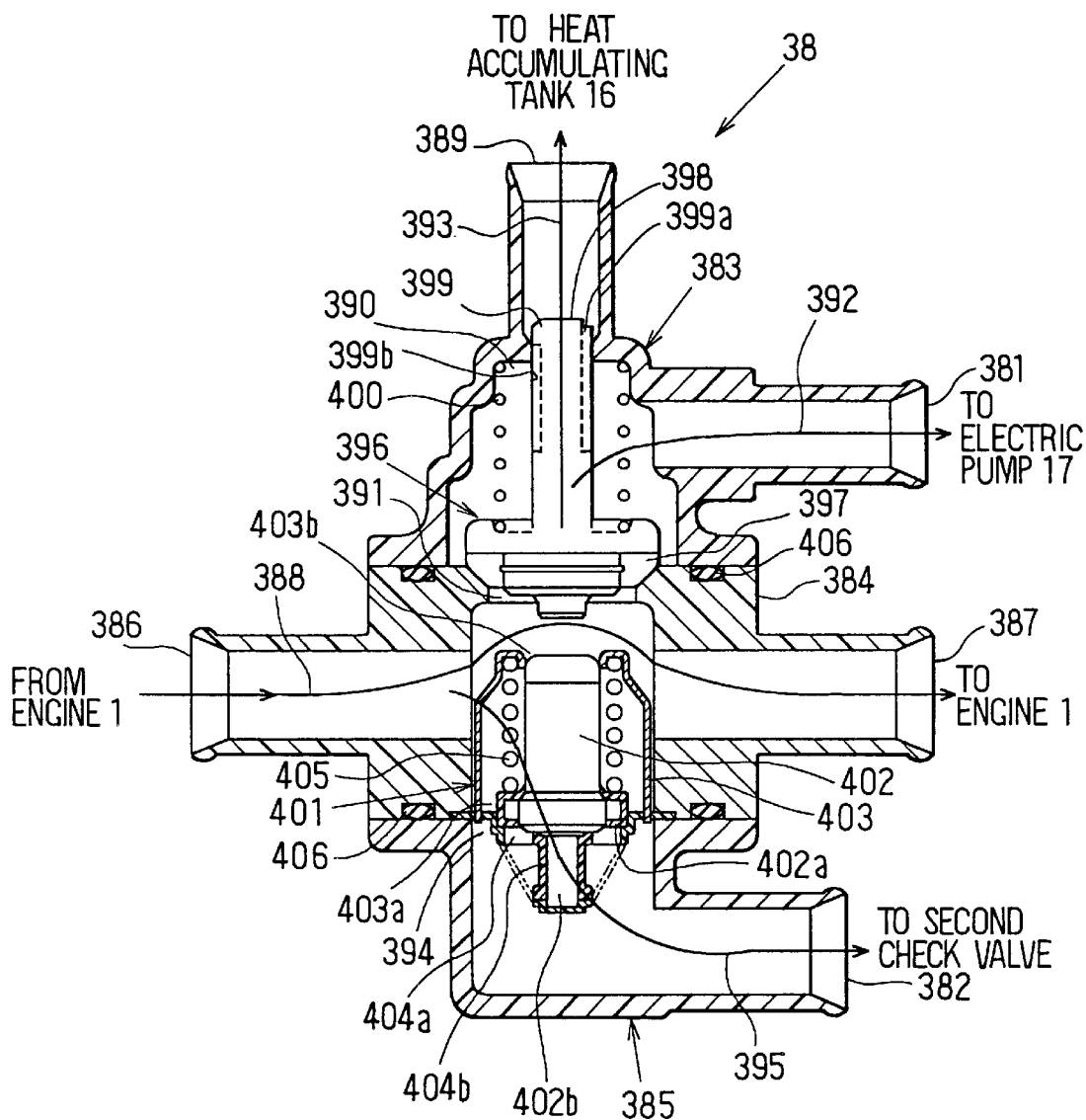
FIG. 15 is a cross sectional view of a control valve.

Next, a detailed structure of the control valve 38 will be described with reference to FIG. 15.

A housing of the control valve 38 is composed of an upper housing 383, a center housing 384, and a lower housing 385. These housings 383–385 are made of resin such as Nylon 66.

In the center housing 384, there are formed an inlet for receiving the cooling water flowed out of the engine 1, and a third outlet 387 communicating directly with the inlet 386 to communicate with the returning bypass passage 39. The returning bypass passage 388 is a passage in which the cooling water flows from the inlet 386 to the inlet 387.

In the upper housing 383, there are formed a flow opening 389 and a first outlet 381 which communicate with a flow opening 16*b* of the heat accumulating tank 16. Both of the flow opening 389 and the first outlet 381 communicate with a space formed in the upper housing 383. The space 390 communicates with a returning bypass passage 388. In a portion of the center housing 384, to which the upper housing 383 is joined, there is formed a first valve opening 391.

In this way, a pump passage 392 leading from the space 390 through the first outlet 381 to the electric pump 17 and a heat accumulating passage 16 leading from the space 390 through the flow opening 389 to the heat accumulating tank 16 communicate with the returning bypass passage 388 in the first valve opening 391.

In the lower housing 385, there is formed a second outlet 382. In a portion where the center housing 384 and the lower housing 385 are joined, there is formed an opening portion 394 for communicating the second outlet 382 and the returning bypass passage 388 with each other. In this way, there is formed a pump bypass passage 395 leading from the returning bypass passage 388 through the opening portion 394 to the pump bypass path 41.

Figure 16:
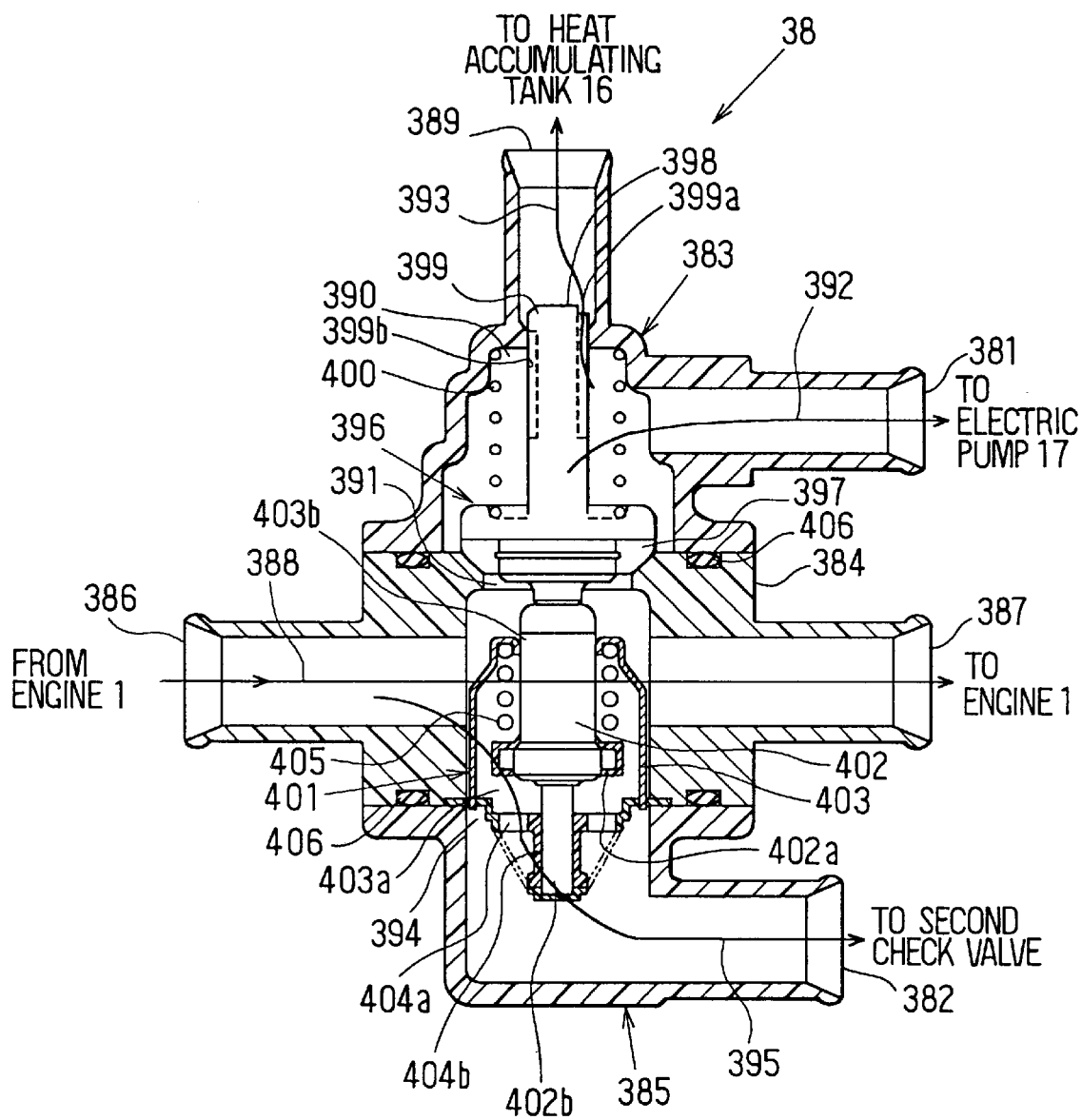
FIG. 16 is a cross sectional view of a control valve, showing a state a temperature of the cooling water flowing in the control valve rises.

A first valve body 391 is for opening or closing the fist valve opening 391. At a portion of the first valve body 396, which contacts with the first valve opening 391, there is attached a packing 397 made of an elastic deformable material such as nitrile rubber to improve the sealing performance. To the second valve opening for communicating the flow opening 389 and the space 390 with each other, there is inserted a cylindrical second valve body 399 which moves integrally with the first valve body 396. on an outer peripheral surface of the second valve body 399, there are formed two grooves 399*a* and 399*b* extending in a longitudinal direction. The groove 399*a* is formed to always communicate the flow opening 389 with the space 390. The groove 399*b* is formed, as shown in FIG. 16, to communicate the flow opening 389 with the space 390 when the first valve opening is opened up to a predetermined opening degree.

A coil spring 400 is for pressing the first valve body 396 at the first valve opening with a predetermined elastic force.

A thermostat 401 is a temperature sensitive valve body which opens or closes the opening portion 394. The thermostat 401 is operated by a variation in a volume of a wax box 402 which is a temperature sensitive actuating member. A casing 403 of the thermostat 401 is made of metal which is superior in corrosion resistance such as stainless. The wax box 402 is disposed in the casing 403 such that an axial direction of the wax box 402 is consistent with an axial directions of the casing 403.

At each axial end of the casing 403, there are formed opening portions 403*a* and 403*b*. The opening portion 403*a* is opened toward the pump bypass passage 395, and the opening portion 403*b* is opened toward the first valve opening 391. The opening portion 403*a* is covered with a cover 404 made of resin and having a third valve opening 404*a*. The third valve opening 404*a* is opened or closed by a flange portion 402*a* formed at an axial end portion of the wax box 402.

On the other hand, in the wax box 402, there is accommodated a shaft 402*b* which is slidable in an axial direction, and a wax having a predetermined melting point. One end of the shaft 402b is inserted into a concave portion 404b formed in the cover 404. The melting point of the wax should be determined while considering a delayed response of the variation in the temperature of the wax with reference to the temperature of the cooling water as a standard of the predetermined value T1. In this embodiment, the melting point of the wax is set for approximately 46° C.

A coil spring 405 presses the wax box 402 and the flange portion 402a at the third valve opening 404a, and O-rings 406 are for maintaining sealing performances of the connecting portions between the upper housing 383 and the center housing 384 and between the center housing 384 and the lower housing 385.

Next, an operation of this embodiment will be described.

(1) An operation of the control valve 38

When the temperature of the cooling water flowing in the returning bypass passage 388 is low, the shaft 402b is positioned, as shown in FIG. 6, to close the third valve opening 404a by the flange portion 402a. In this state, the wax in the wax box 402 is in solid-state.

When the temperature of the cooling water flowing in the returning bypass passage 388 rises gradually, the wax in the wax box 402 starts to be melt so that a volume in the space within the wax box 402 expands. In this way, the wax box 402 moves, as shown in FIG. 16, closer to the first valve body 396 to open the third valve opening 404a. Then, the cooling water from the returning bypass passage 388 starts to flow into the pump bypass passage 395.

When the temperature of the cooling water flowing in the returning bypass passage 388 further rises, the wax box 402 pushes and opens the first valve body 396 while overcoming the elastic force of the coil spring 400. In addition to the groove 399a of the second valve body 399, the groove 399b is also communicated with the returning bypass passage 388. In this way, the first valve opening 391 is opened, the cooling water flowing in the returning bypass passage 388 flows into the space 390, and an amount of the cooling water between the flow opening 389 and the space 390 increases.

(2) An operation of the air conditioning apparatus

Figure 18:
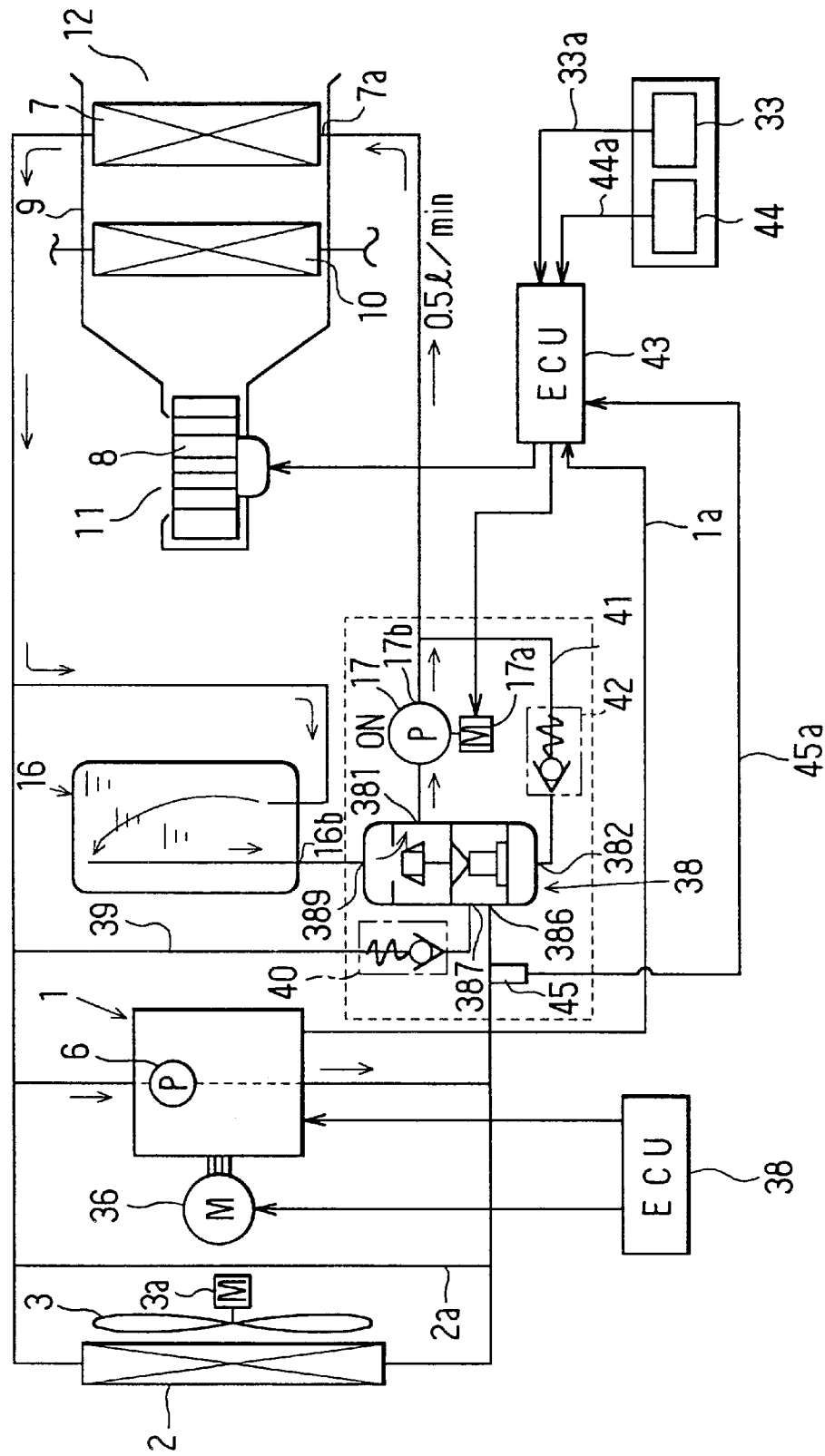
FIG. 18 is an explanatory view of a flow of the cooling water when the temperature of the cooling water is low and while the engine is stopped.

When the temperature of the cooling water is low at a stop of the engine, as shown in FIG. 18, the first valve opening 319 and the third valve opening 404a of the control valve 38 are closed (see FIG. 15), the mechanical pump 6 is stopped, and the blower 8 and the electric pump 17 are operated. Accordingly, an interior pressure in the space 390 of the control valve 38 located at an inlet side of the electric pump 15 lowers, and the cooling water accumulated in the heat accumulating tank 16 flows into the space 390 through the groove 399a formed on the second valve body 399. The cooling water flowed into the space 390 is sucked by the electric pump 17 to be discharged toward the heater core 7, and a large amount of the cooling water having been heat-exchanged returns into the heat accumulating tank 16.

Figure 19:
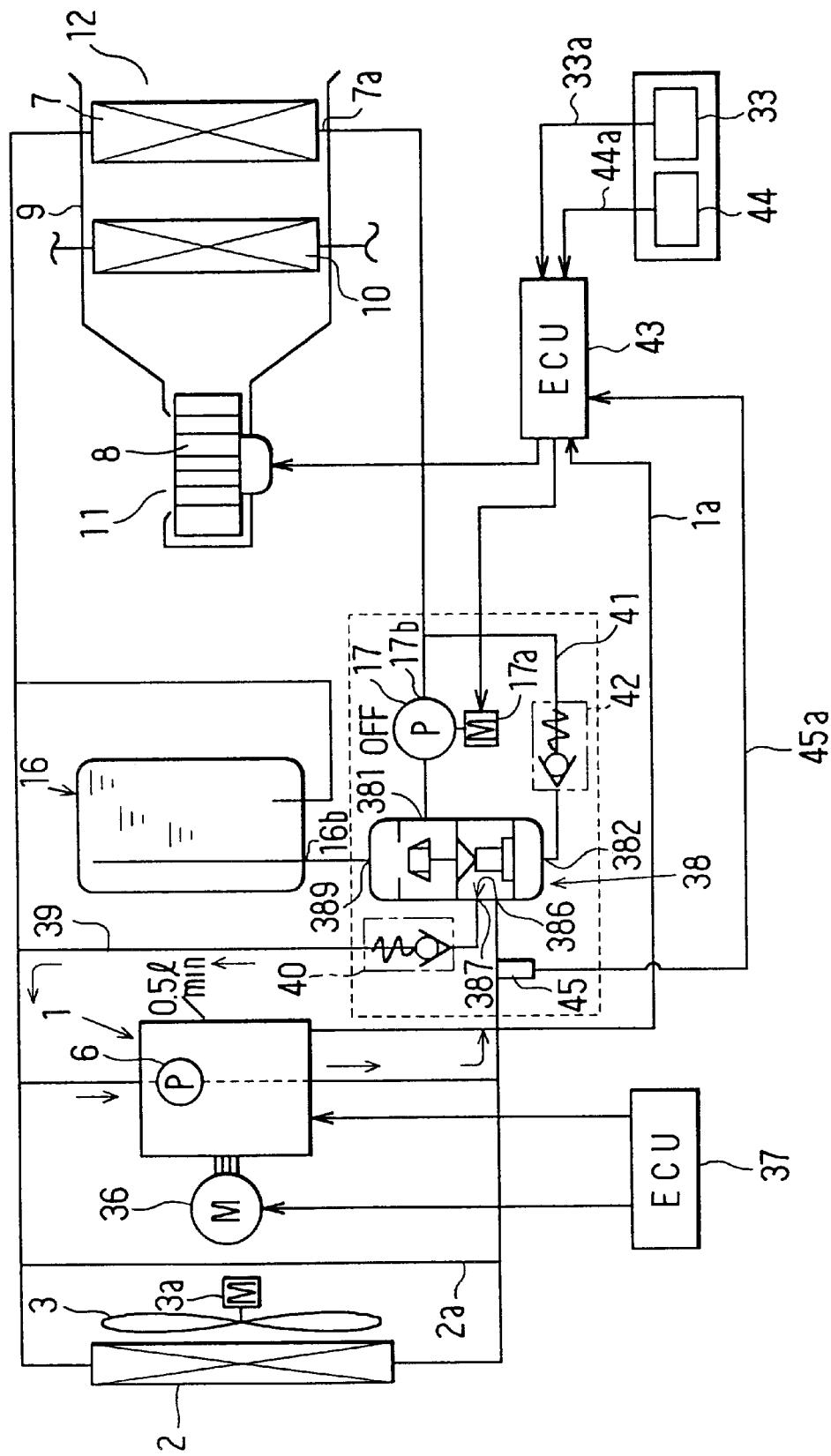
FIG. 19 is an explanatory view of a flow of the cooling water when the temperature of the cooling water is low and while the engine is operating.

When the temperature of the cooling water is low while the engine is operating, as shown in FIG. 19, the first valve opening 319 and the third valve opening 404a of the control valve 38 are closed (see FIG. 15), the mechanical pump 6 is operated. The blower 8 and the electric pump 17 are generally stopped. Accordingly, the cooling water flowing into the heater core 7 is stopped, and the cooling water flowed out of the engine 1 returns through the returning bypass passage 388 of the control valve 38 and the returning bypass path 39 into the engine 1.

If the heating operation is performed when the temperature of the cooling water is low (the temperature is less than 40–50° C. and is in a state where it is difficult to perform the heating operation), the passenger feels uncomfortable. Therefore, the control unit 44 generally controls such that the blower 8 and the electric pump 17 are not operated until the temperature detected by the water temperature sensor 45 reaches a predetermined value (for example, 50° C.) even when the starting switch 44 is turned on. However, when the passenger turns on the fast heating switch 33, the electric pump 17 and the blower 8 are operated, and the hot water is introduced into the heater core 7 to perform the fast heating operation.

Figure 17:
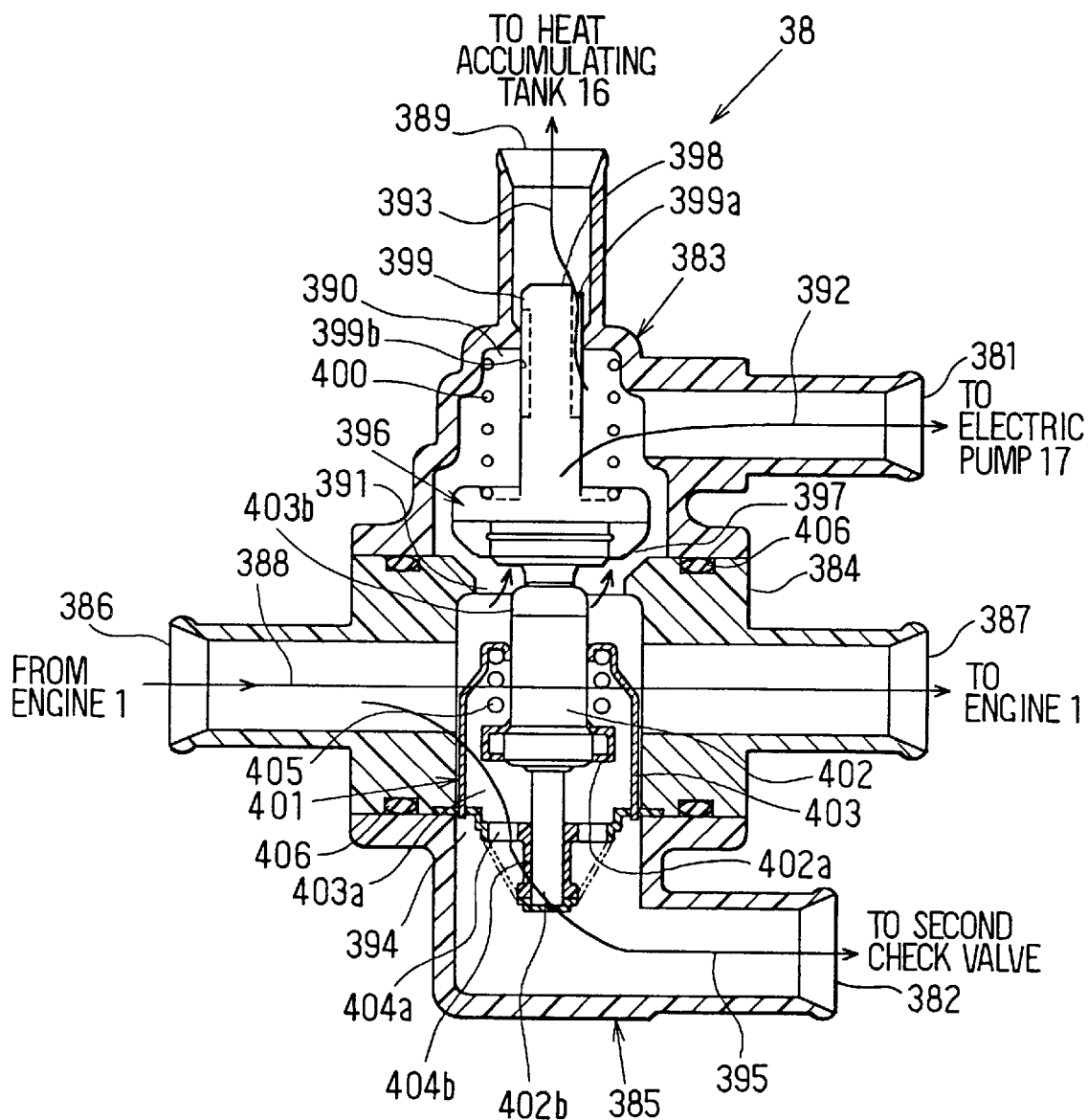
FIG. 17 is a cross sectional view of a control valve, showing a state a temperature of the cooling water flowing in the control valve further rises from the state of FIG. 16.
Figure 20:
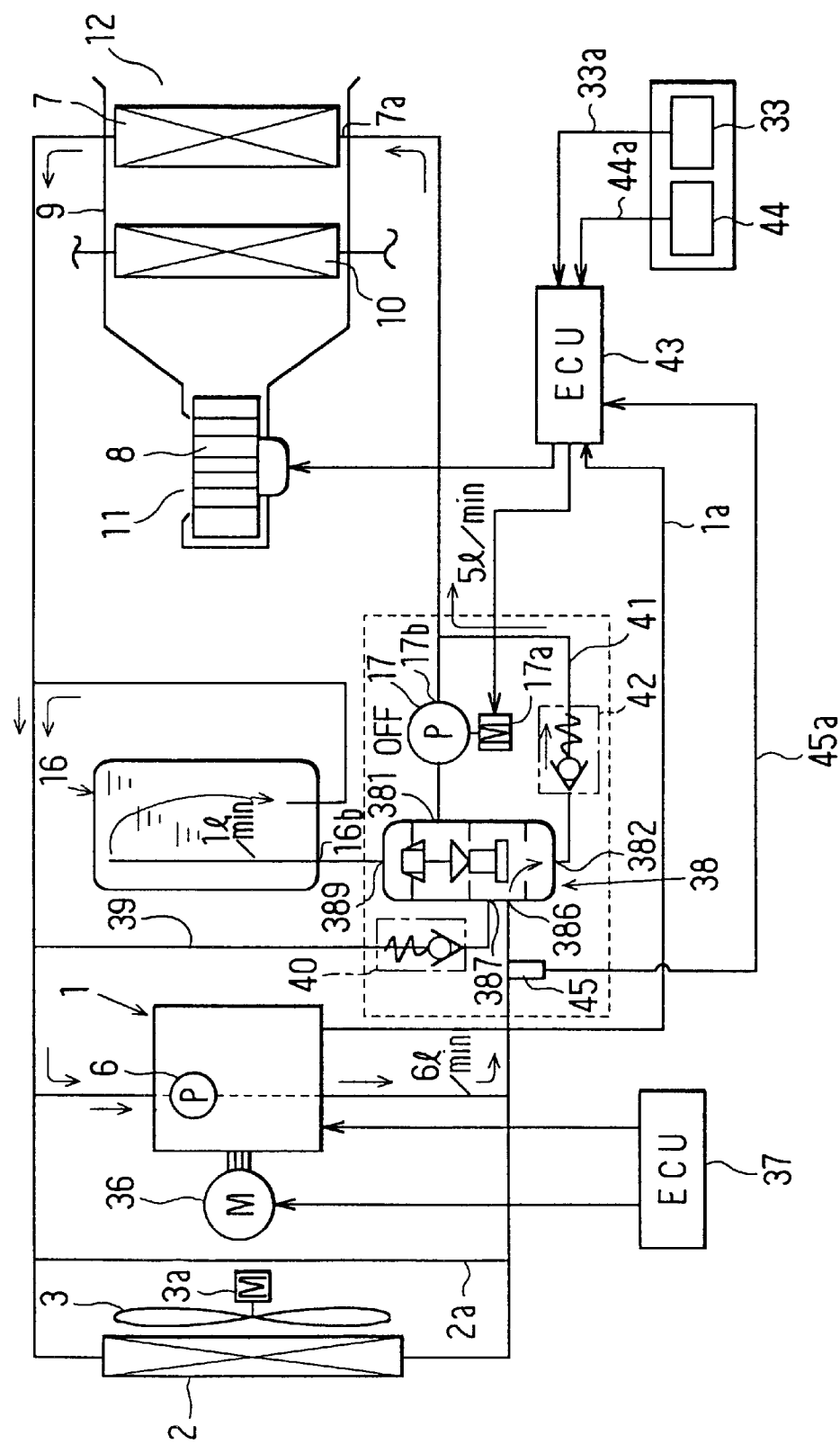
FIG. 20 is an explanatory view of a flow of the cooling water when the temperature of the cooling water is high and while the engine is operating.

When the temperature of the cooling water is high while the engine is operating, as shown in FIG. 20, the first valve opening 319 and the third valve opening 404a of the control valve 38 are opened (see FIG. 17), the mechanical pump 6 is operated, and the electric pump 17 is stopped. Accordingly, most of the cooling water flowed out of the engine 1 returns through the pump bypass passage, the pump bypass path 41, and the heater core 7 into the engine 1, and most of the remaining cooling water returns from the heat accumulating passage 393 through the heat accumulating tank 16 into the engine 1.

That is, in this state, the high-temperature cooling water from the engine 1 is introduced into the heater core 7, and the high-temperature cooling water is introduced into the heat accumulating tank 16 to discharge the cooled cooling water in the heat accumulating tank 16.

Figure 21:
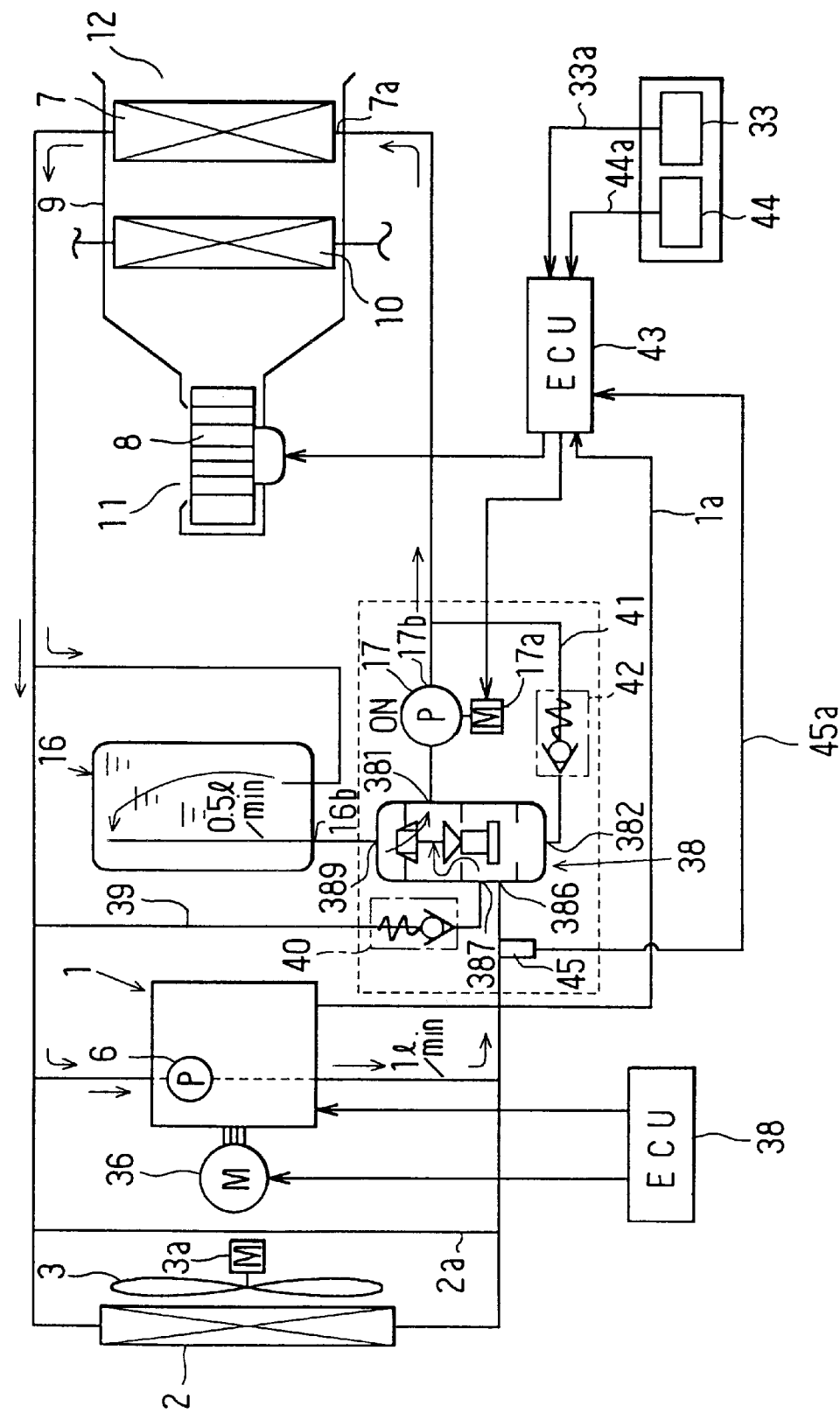
FIG. 21 is an explanatory view of a flow of the cooling water when the temperature of the cooling water is high and while the engine is stopped.

When the temperature of the cooling water is high while the engine is stopped, as shown in FIG. 21, the first valve opening 319 and the third valve opening 404a of the control valve 38 are opened (see FIG. 17), the mechanical pump 6 is stopped, and the electric pump 17 is operated. Accordingly, an interior pressure in the space 390 of the control valve 38 located at an inlet side of the electric pump 15 lowers, and the cooling water accumulated in the heat accumulating tank 16 flows into the space 390 through the grooves 399a and 399b formed on the second valve body 399. Since the space 390 is communicated with the returning bypass passage 388, the cooling water flows into the space 390, and is sucked by the electric pump 17 with the cooling water flowing into the pump 17 to be discharged toward the heater core 7. The cooling water having been heat-exchanged returns into the heat accumulating tank 16 and the engine 1.

In the above-described states, four states of the combination of two states in which the shaft 402b of the control valve 38 is completely stretched and completely shrunk and two states in which the engine 1 is stopped and is operating have been described; however, actually, the shaft 402b is stretched or shrunk continuously in accordance with the variation in the temperature of the cooling water. Therefore, the amount of the cooling water flowing from the engine 1 or the heat accumulating tank 16 into the heater core 7 varies continuously.

Figure 22:
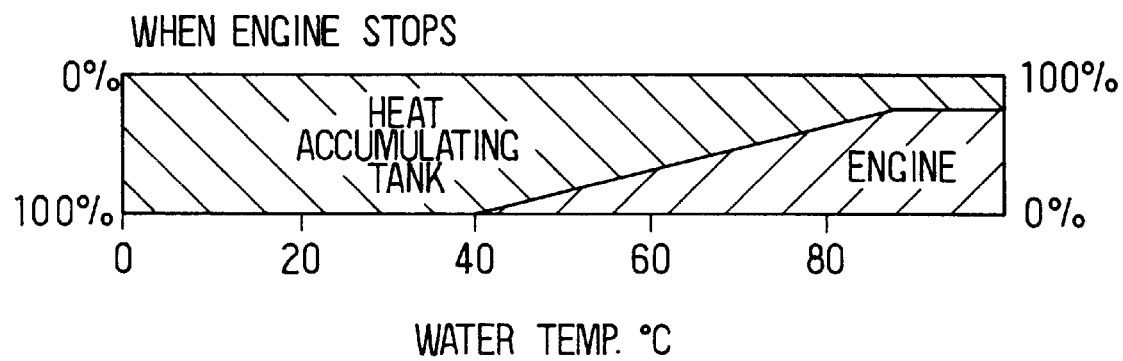
FIG. 22 is a graph showing a ratio of an amount of the cooling water flowing into the heater core.

FIG. 22 shows a ratio of the amount of the cooling water from the engine 1 or the heat accumulating tank 16 into the heater core 7. As being understood therefrom, the ratio of the amount of cooling water flowing from the heat accumulating tank 16 into the heater core 7 becomes larger in accordance with a decrease in the temperature of the cooling water. When the temperature of the cooling water becomes approximately 40° C., the ratio of the amount of the cooling water flowing from the heat accumulating tank 16 becomes 100%. When the temperature of the cooling water is equal to or less than approximately 40° C., the cooling water flows into the heater core 7 with approximately 0.5 liter per a minute. When the temperature of the cooling water is equal to or more than approximately 60° C., the cooling water flows from the heat accumulating tank 16 into the heater core 7 with approximately 0.5 liter per a minute, and the cooling water flows from the engine 1 into the heater core 7 with approximately 1.0 liter per a minute.

Figure 23:
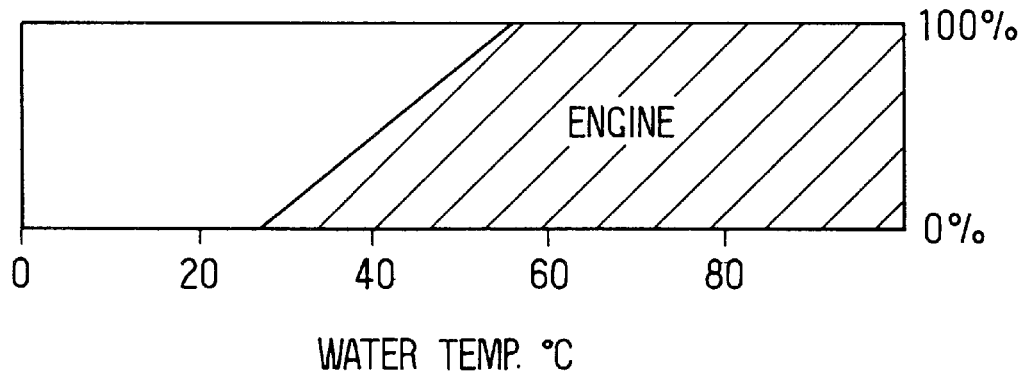
FIG. 23 is a graph showing a variation in the amount of the cooling water flowing into the heater core.

FIG. 23 shows a variation in the amount of the cooling water flowing into the heater core 7 while the engine 1 is operating. When the temperature of the cooling water is approximately 60° C., the amount becomes the maximum value.

Next, features of this embodiment will be described.

When the engine 1 is stopped while the heating operation is performed, the electric pump 17 is operated, and the cooling water in the heat accumulating tank 16 starts to flow into the heater core 7 in addition to the cooling water flowed out of the engine 1. Then, in accordance with a decrease in the temperature of the cooling water, the ratio of the amount of cooling water flowing from the heat accumulating tank 16 into the heater core 7 becomes larger and the ratio of the amount of cooling water flowing from the engine 1 into the heater core 7 becomes smaller.

In this way, it is possible to continue the heating operation even after the engine 1 is stopped and to suppress the cooling water in the engine 1 from flowing out thereof. Accordingly, since the temperature of the engine 1 (engine block) can be prevented from being lowered, the deterioration of the exhaust emission at re-starting of the engine 1 can be prevented.

Further, the amount of the cooling water flowing out of the engine 1 is controlled by a single thermostat 401 so that the structure of the control valve 38 can be simplified. Therefore, it is possible to suppress the increase of the manufacturing costs of the control valve 38 as well as the manufacturing costs of the air conditioning apparatus for the vehicle.

Still further, since each of the valve openings 391, 398 and 404*a* is opened or closed by using the thermal expansion of the wax in the wax box 402, the flow of the cooling water in the cooling water circuit can be controlled with a simple construction and without using an electrical equipment such as a temperature sensor for detecting the temperature of the cooling water and an electromagnetic valve. Therefore, it is possible to suppress the increase of the manufacturing costs of the control valve 38.

This embodiment may be modified such that a packing is disposed at either one of the flange portion 402*a* and the third valve opening 404*a* to completely close the third valve opening 404*a*.

The control valve 38 is mechanically controlled by using the thermostat 401; however, the control valve 38 may be electrically controlled by using a flow control electromagnetic valve for controlling the amount of the cooling water, a water temperature sensor for detecting the temperature of the cooling water, and the like.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A heating apparatus for a vehicle having a water-cooled engine cooled by cooling water, comprising:

a heat exchanger for heating air by carrying out a heat exchange between the air and the cooling water;

a plurality of circuits in which the cooling water circulates, said plurality of circuits including a circuit in which the cooling water flows through said water-cooled engine and an engine bypass circuit in which the cooling water having flowed out of said heat exchanger bypasses said water-cooled engine and flows into said heat exchanger again;

an electric water pump disposed in said plurality of circuits for generating a flow of the cooling water in said plurality of circuits when an electric power is supplied thereto;

selecting means disposed in said plurality of circuits for selecting at least one of said Plurality of circuits in which the cooling water circulates; and control means for controlling said selecting means;

and said electric water pump in such a manner that when said water-cooled engine is stopped, said electric water pump is operated and said selecting means selects said engine bypass circuit.

2. A heating apparatus according to claim 1, further comprising:

a radiator disposed in said plurality of circuits, for cooling the cooling water, wherein, said engine bypass circuit includes a first circuit in which the cooling water circulates at least between said heat exchanger and said radiator or a bypass passage bypassing said radiator, and said control means controls said selecting means such that the cooling water circulates in said first circuit when said engine is stopped.

3. A heating apparatus according to claim 2, further comprising:

a heat accumulating tank disposed in said plurality of circuits for accumulating the cooling water; wherein, said engine bypass circuit includes a second circuit formed in parallel with said first circuit in which the cooling water circulates at least between the heat exchanger and said heat accumulating tank and said control means controls said selecting means such that the cooling water circulates in said first circuit when said engine is stopped and subsequently circulates in said second circuit.

4. A heating apparatus according to claim 3, wherein, said plurality of circuits includes a third circuit in which the cooling water circulates between said heat exchanger and said engine, independently from said engine bypass circuit, and said control means controls said selecting means such that the cooling water circulates in said first circuit when said engine is stopped, subsequently circulates in said second circuit, and subsequently circulates in said third circuit.

5. A heating apparatus according to claim 2, further comprising:

a water temperature sensor for detecting a temperature of the cooling water;

wherein said control means controls said selecting means based on the temperature detected by said water temperature sensor.

6. A heating apparatus according to claim 1, further comprising:

a radiator disposed in said plurality of circuits for cooling the cooling water; and a heat accumulating tank disposed in said plurality of circuits for accumulating the cooling water; wherein, said engine bypass circuit includes a first circuit in which the cooling water circulates at least among said heat exchanger, said radiator or a bypass passage bypassing said radiator, and said heat accumulating tank, and said control means controls said selecting means such that the cooling water circulates in said first circuit when said engine is stopped.

7. A heating apparatus according to claim 6, wherein, said plurality of circuits includes a second circuit in which the cooling water circulates between said heat exchanger and said engine, independently from said engine bypass circuit, and said control means controls said selecting means such that the cooling water circulates in said first circuit when said engine is stopped and subsequently circulates in said second circuit.

8. A heating apparatus according to claim 7, wherein said heat accumulating tank is disposed in said second circuit.

9. A heating apparatus according to claim 6, further comprising:

a water temperature sensor for detecting a temperature of the cooling water;

wherein said control means controls said selecting means based on the temperature detected by said water temperature sensor.

10. A heating apparatus for a vehicle having a passenger compartment and a water-cooled engine cooled by cooling water, comprising:

a blower for generating an air flow;

an air conditioning duct for introducing the air flow generated by said blower into said passenger compartment;

a heat exchanger for heating the air blown from said blower by using the cooling water flowing therethrough as a heating source;

a plurality of circuits in which the cooling water circulates said plurality of circuits including a circuit in which the cooling water flows through said water-cooled engine and an engine bypass circuit in which the cooling water having flowed out of said heat exchanger bypasses said water-cooled engine and flows into said heat exchanger again;

an electric water pump disposed in said plurality of circuits for generating a flow of the cooling water in said plurality of circuits when an electric power is supplied thereto;

selecting means disposed in said plurality of circuits for selecting one of said plurality of circuits in which the cooling water circulates; and control means for controlling said selecting means;

and said electric water pump in such a manner that when said water-cooled engine is stopped, said electric water pump is operated and said selecting means selects said engine bypass circuit.

* * * * *